US012321109B2

(12) United States Patent
Nogami et al.

(10) Patent No.: US 12,321,109 B2
(45) Date of Patent: Jun. 3, 2025

(54) IMAGE FORMING APPARATUS FOR USE WITH DETACHABLE TONER CONTAINER

(71) Applicant: CANON KABUSHIKI KAISHA, Tokyo (JP)

(72) Inventors: Kazuaki Nogami, Kanagawa (JP); Takeo Kawanami, Kanagawa (JP); Akinori Mitsumata, Tokyo (JP); Takehiro Miyashita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/457,445

(22) Filed: Aug. 29, 2023

(65) Prior Publication Data

US 2023/0408950 A1 Dec. 21, 2023

Related U.S. Application Data

(63) Continuation of application No. PCT/JP2022/008884, filed on Mar. 2, 2022.

(30) Foreign Application Priority Data

Mar. 5, 2021 (JP) ................................ 2021-035880

(51) Int. Cl.
*G03G 15/08* (2006.01)
*G03G 15/00* (2006.01)

(52) U.S. Cl.
CPC ..... *G03G 15/0886* (2013.01); *G03G 15/0863* (2013.01); *G03G 15/0872* (2013.01); (Continued)

(58) Field of Classification Search
CPC ........... G03G 15/0886; G03G 15/0863; G03G 15/0872; G03G 15/0891; G03G 15/5016; G03G 2215/0692
See application file for complete search history.

(56) References Cited

U.S. PATENT DOCUMENTS 5,848,338 A * 12/1998 Okada ................ G03G 15/0886 399/119
2006/0216046 A1* 9/2006 Hatakeyama ...... G03G 15/0863 399/27

(Continued)

FOREIGN PATENT DOCUMENTS

JP 2010054994 A 3/2010
JP 2018120075 A 8/2018

(Continued)

OTHER PUBLICATIONS

International Search Report issued in Intl. Appln. No. PCT/JP2022/008884 mailed Apr. 12, 2022. English translation provided.

(Continued)

*Primary Examiner* — Sandra Brase
(74) *Attorney, Agent, or Firm* — ROSSI, KIMMS & McDOWELL LLP

(57) ABSTRACT

An image forming apparatus includes an attaching portion including an operation member configured to be movable together with a container shutter, a toner storage portion configured to store toner received from a receiving port, an actuator configured to regulate a movement of the operation member, and a control unit configured to control the actuator. The operation member is configured to open and close the container shutter from an outside in a state in which the toner container is attached to the attaching portion. In a case where a predetermined condition is met, the control unit controls the actuator to release a regulation of the movement of the operation member.

20 Claims, 32 Drawing Sheets

(52) U.S. Cl.
CPC ..... *G03G 15/0891* (2013.01); *G03G 15/5016* (2013.01); *G03G 2215/0692* (2013.01)

(56) References Cited

U.S. PATENT DOCUMENTS

| | | | | |
|---|---|---|---|---|
| 2013/0243445 | A1* | 9/2013 | Takahira ............ | G03G 15/0886 399/13 |
| 2018/0120734 | A1* | 5/2018 | Kitagawa ........... | G03G 15/0872 |
| 2018/0210370 | A1 | 7/2018 | Wakimoto et al. | |
| 2020/0310337 | A1 | 10/2020 | Nguyen | |
| 2021/0041803 | A1 | 2/2021 | Kobayashi et al. | |

FOREIGN PATENT DOCUMENTS

| | | | |
|---|---|---|---|
| JP | 2020154300 | A | 9/2020 |
| JP | 2020160247 | A | 10/2020 |
| JP | 2021026218 | A | 2/2021 |

OTHER PUBLICATIONS

Written Opinion issued in Intl. Appln. No. PCT/JP2022/008884 mailed Apr. 12, 2022.
Extended European search report issued in European Appln. No. 22763332.8 mailed on Feb. 17, 2025.

* cited by examiner

IMAGE FORMING APPARATUS FOR USE WITH DETACHABLE TONER CONTAINER

CROSS-REFERENCE TO RELATED APPLICATIONS

This application is a Continuation of International Patent Application No. PCT/JP2022/008884, filed Mar. 2, 2022, which claims the benefit of Japanese Patent Application No. 2021-035880, filed Mar. 5, 2021, both of which are hereby incorporated by reference herein in their entirety.

BACKGROUND OF THE INVENTION

Field of the Invention

This invention relates to an image forming apparatus forming an image on a sheet.

Description of the Related Art

In image forming apparatuses of an electrophotographic system, configurations in which developer is replenished to developer containers using replenishment containers that can be attached to and detached from the image forming apparatuses are known. In Japanese Patent Application Laid-Open No. 2020-154300, a configuration in which an opening/closing of a shutter member of a replenishment container is performed by rotating the replenishment container attached to an image forming apparatus is disclosed.

However, a shutter member described in Japanese Patent Application Laid-Open No. 2020-154300 is always openable and closable when the replenishment container is rotated, and cannot regulate toner replenishment in a case where performing a toner supply by the replenishment container is not desirable.

SUMMARY OF THE INVENTION

According to a first aspect of the present invention, an image forming apparatus to which a toner container including an opening portion for supplying toner and a container shutter configured to open and close the opening portion is detachably attached, the image forming apparatus includes an attaching portion to which the toner container is attached, the attaching portion including a receiving port configured to receive the toner supplied from the toner container, and an operation member configured to be movable together with the container shutter and configured to open and close the container shutter from an outside in a state in which the toner container is attached to the attaching portion, a toner storage portion configured to store the toner received from the receiving port, an actuator configured to regulate a movement of the operation member, and a control unit configured to control the actuator. The control unit controls the actuator to release a regulation of the movement of the operation member in a case where a predetermined condition is met.

According to a second aspect of the present invention, an image forming apparatus includes a receiving portion including a receiving port configured to receive toner supplied from an outside, an apparatus body shutter configured to open and close the receiving port, and an operation member configured to open and close the apparatus body shutter from an outside, a toner storage portion configured to store the toner received from the receiving port, an actuator configured to regulate a movement of the operation member, and a control unit configured to control the actuator. The control unit controls the actuator to release a regulation of the movement of the operation member in a case where a predetermined condition is met.

Further features of the present invention will become apparent from the following description of exemplary embodiments with reference to the attached drawings.

DESCRIPTION OF THE EMBODIMENTS

Hereinafter, with reference to drawings, embodiments for implementing the present invention will be exemplarily described in detail based on examples. However, sizes, materials, shapes, relative arrangements, and the likes of components described in this embodiment are to be appropriately changed in accordance with configurations and various conditions of apparatuses to which this invention is applied. That is, it is to be understood that a scope of this invention is not limited to the embodiments described below.

First Embodiment

Figure 1:
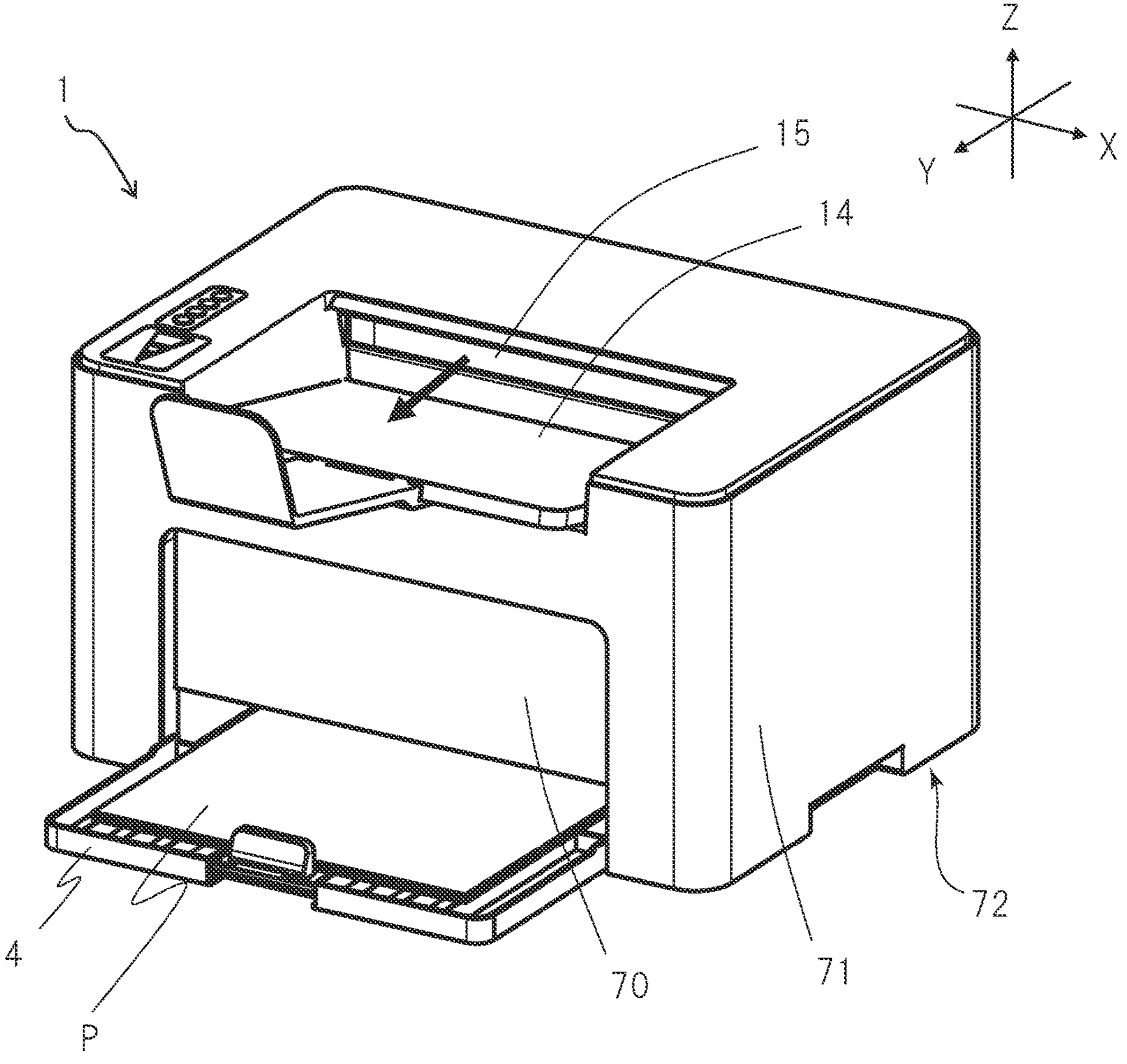
FIG. 1 is a perspective view illustrating an image forming apparatus of a first embodiment.
Figure 2:
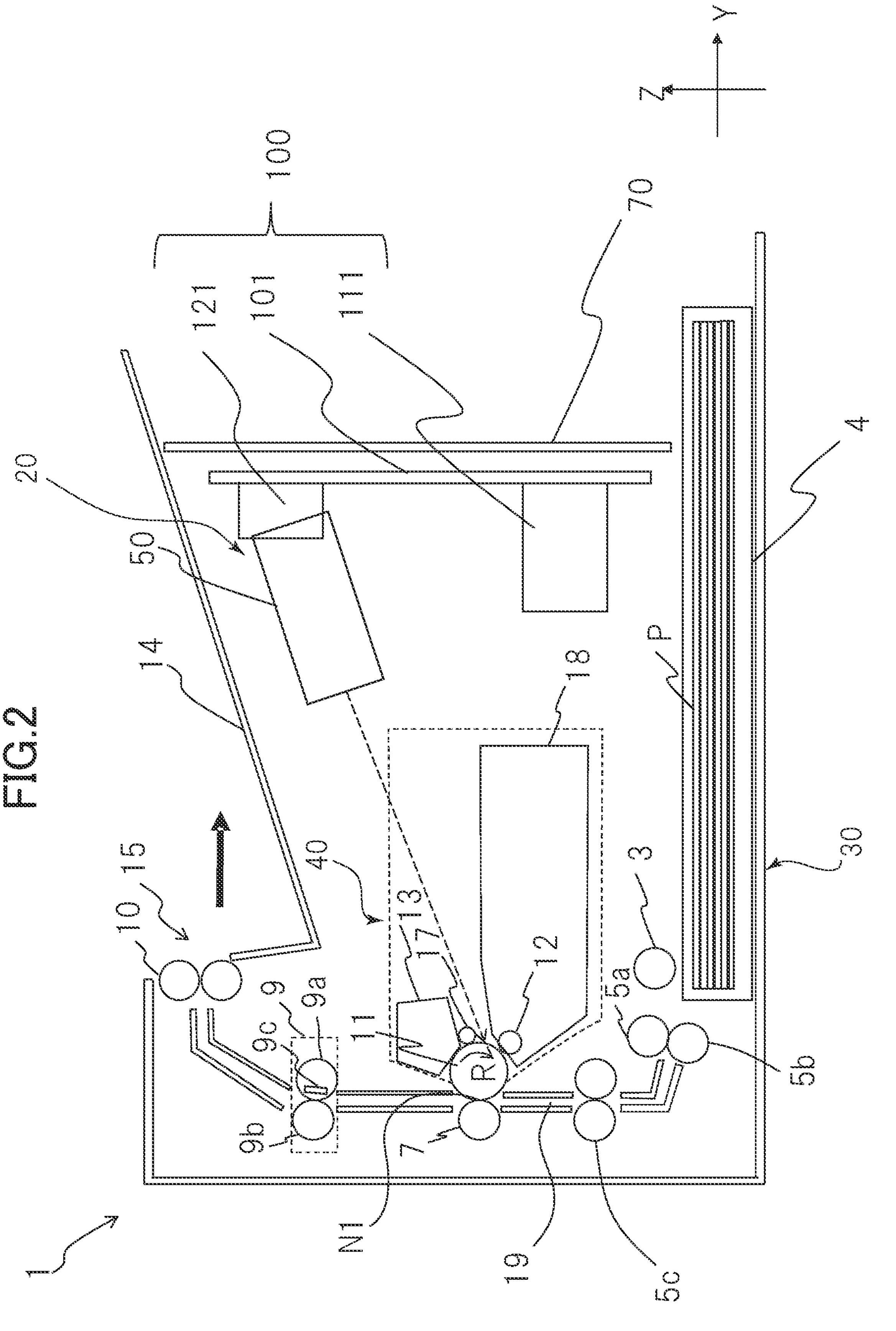
FIG. 2 is an overall schematic view illustrating the image forming apparatus.

FIG. 1 is a perspective view illustrating an image forming apparatus 1 of a first embodiment. FIG. 2 is a schematic view illustrating a configuration of the image forming apparatus 1. The image forming apparatus 1 is a monochrome printer forming an image on a recording material based on image information input from an external apparatus. The recording material includes various sheet materials different in a material including paper such as standard paper and cardboard, a plastic film such as a sheet for an overhead projector, a sheet of a special shape such as an envelope and index paper, cloth, and the like.

Further, in the following descriptions, in a case where the image forming apparatus 1 is installed on a horizontal surface, a height direction (direction opposite to the vertical direction) is referred to as a Z direction. A direction intersecting with the Z direction and parallel to a rotational axis direction (main scanning direction) of a photosensitive drum 11, described below, is referred to as an X direction. A direction intersecting with the X and Z directions is referred to as a Y direction. The X, Y, and Z directions preferably perpendicularly intersect with each other. Further, for convenience, a plus side and a minus side in the X direction are respectively referred to as a right side and a left side, a plus side and a minus side in the Y direction are respectively referred to as a front side or a fore side and a back side or a rear side, and a plus side and a minus side in the Z direction are respectively referred to as an upper side and a lower side.

Overall Configuration

As illustrated in FIGS. 1 and 2, the image forming apparatus 1 includes an image forming unit 20 forming a toner image on the recording material, a sheet feed unit 30 feeding a recording material P, a fixing unit 9 fixing the toner image formed by the image forming unit 20 on the recording material P, and a sheet discharge roller pair 10.

The image forming unit 20 includes a scanner unit 50, a process unit 40 of an electrophotographic system, and a transfer roller 7 transferring the toner image formed on the photosensitive drum 11 onto the recording material P. The process unit 40 includes the photosensitive drum 11, a cleaning unit 13 arranged adjacently to the photosensitive drum 11, a charge roller 17, a developing roller 12, and a storage portion 18 storing toner. To be noted, the process unit 40 may be secured to a casing 72 of the image forming apparatus 1 with a screw, and includes those that are detached by a service man.

The photosensitive drum 11, serving as an image bearing member, is a photosensitive member formed in a cylindrical shape. The photosensitive drum 11 includes a photosensitive layer formed of a negatively chargeable organic photoreceptor on a drum-shaped base body formed of aluminum. Further, the photosensitive drum 11, serving as the image bearing member, is rotatably driven in a predetermined direction (arrow R direction in FIG. 1) at a predetermined process speed by a motor.

The charge roller 17 forms a charge portion by coming into contact with photosensitive drum 11 with predetermined pressure contact force. Further, since a desired charge voltage is applied by a high voltage charging power supply, a surface of the photosensitive drum 11 is uniformly charged to a predetermined potential. In the present embodiment, the photosensitive drum 11 is charged to a negative polarity by the charge roller 17.

The scanner unit 50 scans and exposes the surface of the photosensitive drum 11 by irradiating the photosensitive drum 11 with a laser beam corresponding to the image information input from the external apparatus using a polygon mirror. By this exposure, an electrostatic latent image corresponding to the image information is formed on the surface of the photosensitive drum 11. To be noted, the scanner unit 50 is not limited to a laser scanner apparatus, and, for example, it is acceptable to apply a light-emitting diode (LED) exposure apparatus with an LED array in which a plurality of LEDs are arranged in a row along a longitudinal direction of the photosensitive drum 11.

The developing roller 12 is rotatably supported by the storage portion 18, serving as a toner storage portion. Further, so as to face the photosensitive drum 11, the developing roller 12 is arranged in an opening portion of a developer container 230 (refer to FIG. 4) including the storage portion 18. To be noted, in the storage portion 18, it is acceptable to dispose a supply roller that applies the toner, serving as developer, to a surface of the developing roller 12.

The process unit 40 of the present embodiment uses a contact developing system as a developing system. That is, a toner layer borne on the developing roller 12 comes into contact with the photosensitive drum 11 in a developing portion (developing region) in which the photosensitive drum 11 and the developing roller 12 face each other. A developing voltage is applied to the developing roller 12 by a high voltage developing power supply. By transferring the toner borne by the developing roller 12 from the developing roller 12 to the drum surface under the developing voltage according to an electrical potential distribution on the surface of the photosensitive drum 11, the electrostatic latent image is developed to the toner image.

Further, the toner of the present embodiment does not contain a magnetic component, and is a so-called non-magnetic one-component developer whose toner is borne by the developing roller 12 mainly by intermolecular force and by electrostatic force (image force). However, it is acceptable to use a one-component developer containing a magnetic component. Further, so as to adjust the fluidity and the charging performance of the toner, an additive (for example, wax and silica fine particles) other than a toner particle is sometimes contained in the one-component developer. Further, it is acceptable to use a two-component developer constituted by the non-magnetic toner and a carrier having magnetism. In a case of using the carrier having the magnetism, as a developer bearing member, a cylindrically shaped developing sleeve in which a magnet is arranged inside is used.

The fixing unit 9 is of a heat-fixing method which performs a fixing process of the image by heating and melting the toner on the recording material. The fixing unit 9 includes a heating roller 9*a* incorporating a fixing heater 9*c* and a press roller 9*b* coming into pressure contact with the heating roller 9*a*.

The sheet feed unit 30 includes a cassette 4 in which the recording material P is stacked, a pickup roller 3, serving as a conveyance unit, a feed roller 5*a*, and a separation roller 5*b*. A front cover 70 is disposed in part of an end surface on the front side of the image forming apparatus 1, and covers a circuit board 100. The casing 72 includes the front cover 70, a sheet discharge tray 14, a back cover 73 (refer to FIG. 3A), and an exterior cover 71 that constitutes an exterior of the image forming apparatus 1 apart from the front cover 70, the sheet discharge tray 14, and the back cover 73. In the casing 72, a sheet discharge port 15 through which the sheet discharged to the sheet discharge tray 14 passes is formed.

As illustrated in FIG. 2, the image forming apparatus 1 includes the circuit board 100. The circuit board 100 is constituted by a wiring board 101 made of an insulator, and electronic components 111 and 121 soldered to the wiring board 101. Since a conductor is wired on a surface and in an interior of a board of the wiring board 101, the electronic components 111 and 121 are electrically connected to each other. The circuit board 100 has functions such as converting an alternating current supplied from the outside of the image forming apparatus 1 into a direct current and converting an input voltage so as to obtain a predetermined voltage value required for an image forming process.

The circuit board 100 is arranged in an orientation in which a surface of the wiring board 101, on which the electronic components 111 and 121 are attached, intersects with a sheet discharge direction. Further, the wiring board 101 is disposed between the front cover 70 and the scanner unit 50 in the sheet discharge direction. On the wiring board 101, the electronic components 111 and 121 are disposed on a side of a surface that faces the scanner unit 50.

Next, an image forming operation of the image forming apparatus 1 will be described. When an image formation instruction is input to the image forming apparatus 1, the image forming process by the image forming unit 20 is started based on the image information input from an external computer connected to the image forming apparatus 1. The scanner unit 50 irradiates the laser beam toward the photosensitive drum 11 based on the input image information. At this time, the photosensitive drum 11 has been charged by the charge roller 17 beforehand, and, by irradiating the laser beam, the electrostatic latent image is formed on the photosensitive drum 11. Thereafter, this electrostatic latent image is developed by the developing roller 12, and the toner image is formed on the photosensitive drum 11.

In parallel with the image forming process described above, the pickup roller 3 of the sheet feed unit 30 sends out the recording material P supported on the cassette 4. The recording P is separated into one sheet at a time by the feed roller 5*a* and the separation roller 5*b*, and conveyed to a conveyance roller pair 5*c*. Then, by the conveyance roller pair 5*c*, serving as a conveyance unit, the recording material P is conveyed toward a transfer nip N1, serving as an image forming portion formed by the transfer roller 7 and the photosensitive drum 11.

A transfer voltage is applied from a high voltage transferring power supply to the transfer roller 7, and the toner image borne on the photosensitive drum 11 is transferred onto the recording material P conveyed by the conveyance roller pair 5*c*. The recording material P onto which the toner image has been transferred is conveyed to the fixing unit 9, and, at a time of passing through a nip portion between the heating roller 9*a* and the press roller 9*b* of the fixing unit 9, the toner image is heated and pressed. Thereby, the toner particle is melted, and, by being adhered thereafter, the toner image is fixed on the recording material P The recording material P having passed through the fixing unit 9 is discharged from the sheet discharge port 15 to the outside of the image forming apparatus 1 (external to the apparatus) by the sheet discharge roller pair 10, and loaded on the sheet discharge tray 14. After the toner image has been transferred onto the recording material P, the toner remained on the photosensitive drum 11 is cleaned by the cleaning unit 13.

To be noted, while the image forming apparatus 1 of the present embodiment is configured to be capable of forming the image only on one side of the recording material P, it is not limited to this. For example, it is acceptable to configure such that, by disposing a duplex conveyance path for inverting the recording material P on whose first surface the image has been formed, the image forming apparatus 1 is capable of forming the image on both surfaces of the recording material P.

Figure 3A:
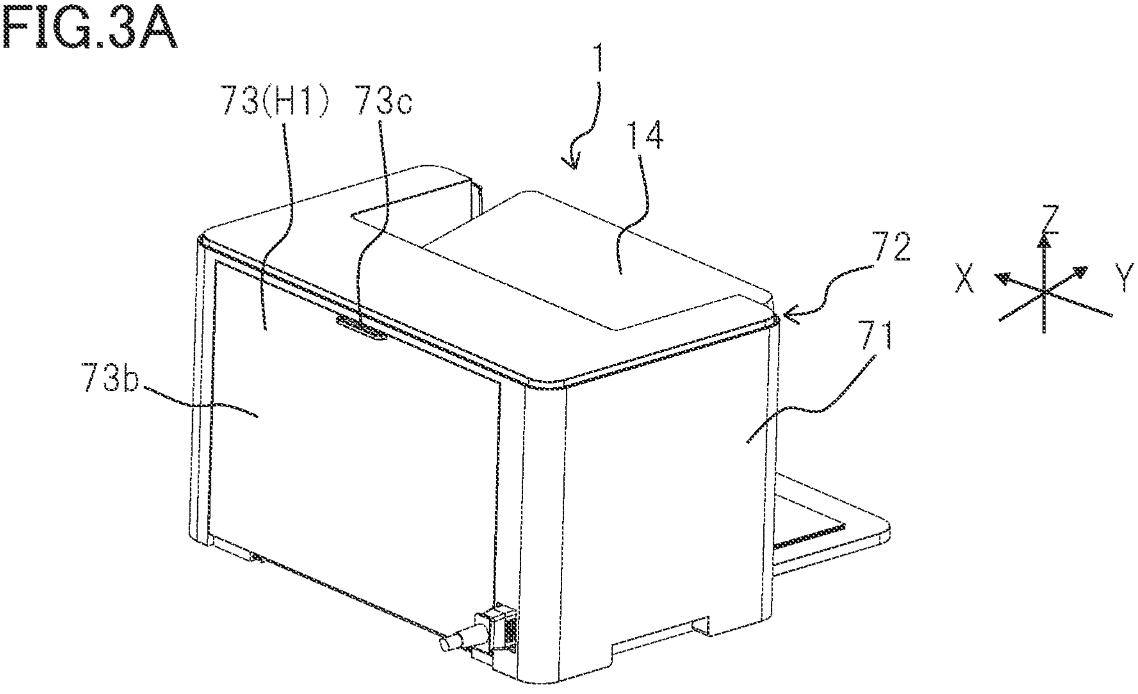
FIG. 3A is a perspective view illustrating the image forming apparatus with a back cover closed.
Figure 3B:
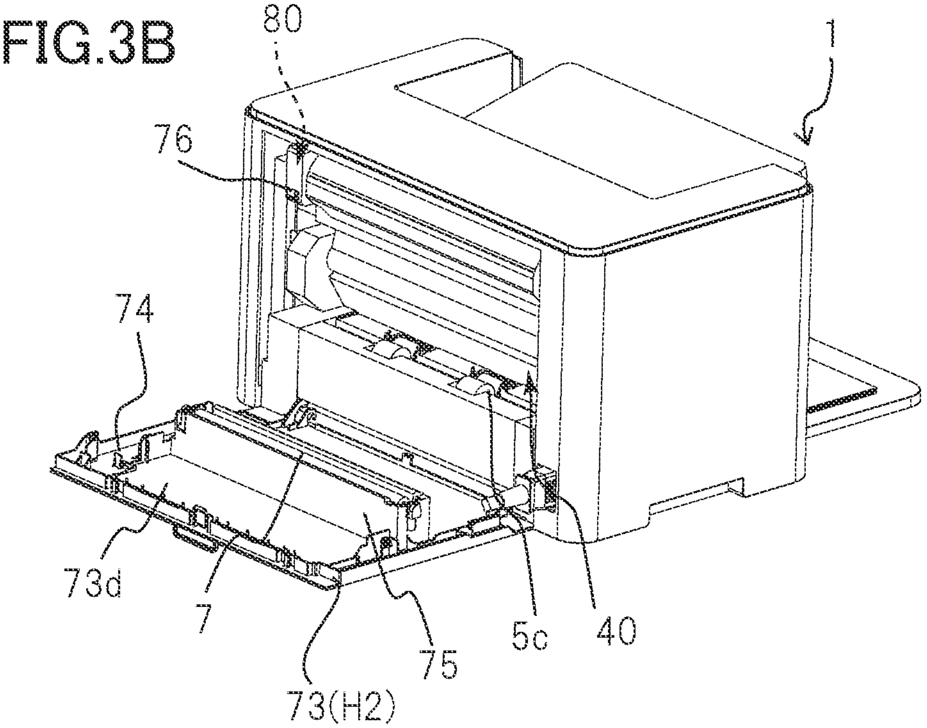
FIG. 3B is a perspective view illustrating the image forming apparatus with the back cover opened.

As illustrated in FIGS. 3A and 3B, in the back surface of the image forming apparatus 1, the back cover 73 that is supported in an openable and closable manner is disposed. The back cover 73, serving as an opening/closing member, covers the process unit 40 in a closed state, and, by being opened, exposes the process unit 40.

Further, by opening the back cover 73, a conveyance path 19 (refer to FIG. 2) through which the sheet conveyed by the conveyance roller pair 5*c* passes is opened. That is, the back cover 73 is movable between a closed position H1 covering the conveyance path 19 and an opening position H2 exposing the conveyance path 19 to the outside. Thereby, it is possible to detach a jam that has occurred in the conveyance path 19.

On an outer surface 73*b* of the back cover 73, that is, a surface constituting an exterior surface of the casing 72, a gripping portion 73*c* which a user can grip at a time of opening and closing the back cover 73 is disposed. On an inner surface 73*d* on a side opposite to the outer surface 73*b* of the back cover 73, a rib 74 and a support portion 75 rotatably supporting the transfer roller 7 are disposed. The rib 74 extends from the inner surface 73*d* toward a direction in which the back cover 73 is closed.

In the image forming apparatus 1, an opening portion 76 arranged in a position corresponding to the rib 74 in a state in which the back cover 73 is closed is disposed, and an opening/closing detection sensor 80 is disposed inside of the opening portion 76. To be noted, it is acceptable to dispose the opening portion 76 either in the process unit 40 or in a component of the image forming apparatus 1 other than the process unit 40.

Figure 3C:
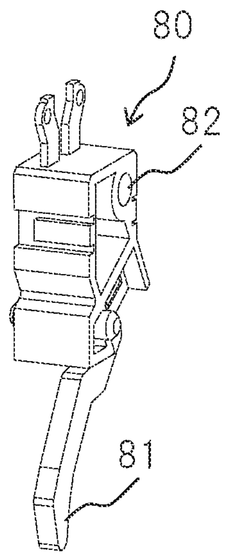
FIG. 3C is a perspective view illustrating an opening/closing detection sensor.

As illustrated in FIG. 3C, the opening/closing detection sensor 80 includes a flag portion 81 and a sensor portion 82, and, when the flag portion 81 is pressed by the rib 74 of the back cover 73, the sensor portion 82 makes transition, for example, from an off state to an on state. Further, when the back cover 73 is opened, the rib 74 of the back cover 73 is separated from the flag portion 81, and the sensor portion 82 makes transition, for example, from the on state to the off state. As described above, the opening/closing detection sensor 80 can detect the opening/closing of the back cover 73.

Developer Container

Figure 4:
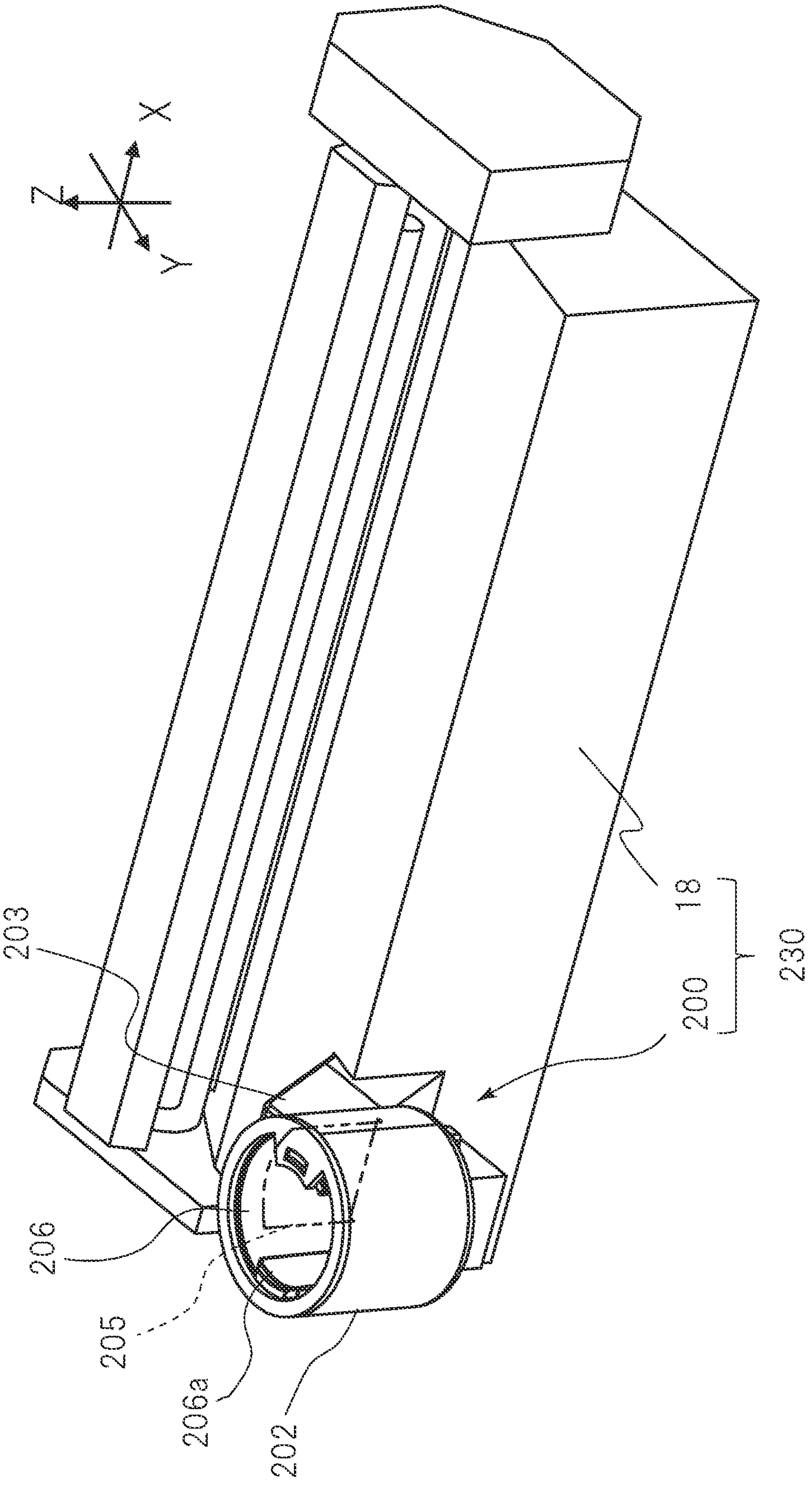
FIG. 4 is a perspective view illustrating a developer container.

Next, using FIGS. 4 and 5, the developer container 230 and configurations adjacent to the developer container 230 will be described. As illustrated in FIG. 4, the developer container 230 is constituted from the storage portion 18 and a replenishment portion 200, serving as an attaching portion and a receiving portion. The replenishment portion 200 includes an operation portion 201, a cylindrically shaped toner receiving portion 202, a replenishment path portion 203 connecting the toner receiving portion 202 and the storage portion 18, and an apparatus body shutter portion 206, serving as an apparatus body shutter. In an inner wall of the toner receiving portion 202, a side opening 205 leading to the replenishment path portion 203 is formed.

Figure 5:
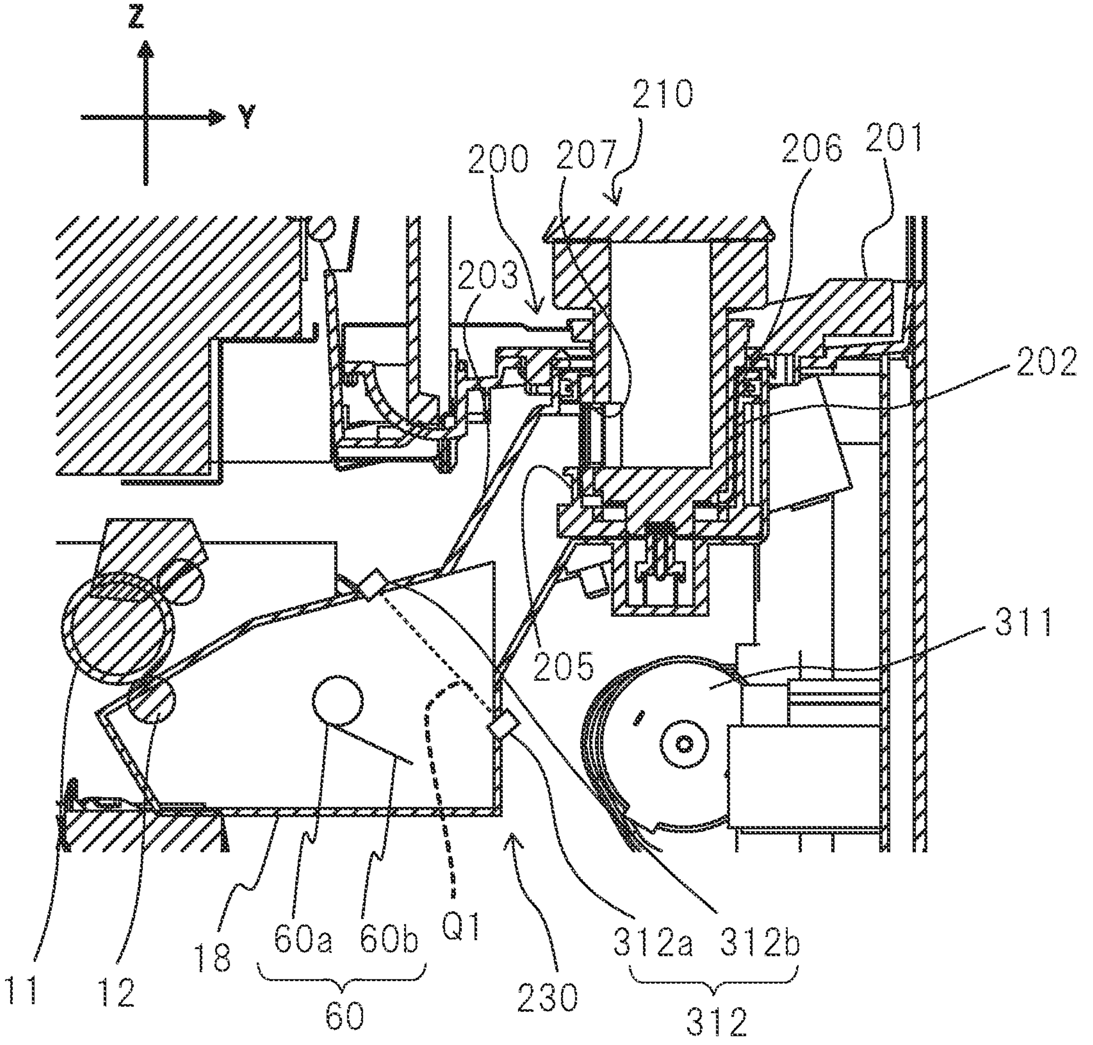
FIG. 5 is a cross-sectional view illustrating a replenishment portion and the developer container.

As illustrated in FIG. 5, a replenishment pack 210, described below, is attached to the replenishment portion 200, and the toner discharged from the replenishment pack 210 is replenished to the storage portion 18 through an opening 207 of the apparatus body shutter portion 206, the side opening 205 of the toner receiving portion 202, and the replenishment path portion 203.

As illustrated in FIG. 4, the replenishment path portion 203 is connected to a side of a first end of the storage portion 18 in a longitudinal direction of the developer container 230, that is, in the X direction. In an interior of the storage portion 18, as illustrated in FIG. 5, an agitation member 60 rotating around a rotation shaft 60*a* extending in the X direction as a center is disposed. The agitation member 60 includes a blade portion 60*b* secured to the rotation shaft 60*a*, and, by being rotatably driven by a drive motor 311, conveys the toner toward the developing roller 12, in conjunction with agitating the toner in the interior of the storage portion 18. To be noted, while, in the present embodiment, the agitation member 60 is constituted by the rotation shaft 60*a* and the blade portion 60*b*, it is acceptable to use a helical shape agitation member as a configuration that distributes the toner over the whole length of the storage portion 18.

Further, the agitation member 60 has a role of uniformizing the toner in the interior of the storage portion 18 by circulating the toner that has not been used for developing but has been stripped from the developing roller 12. To be noted, the agitation member 60 is not limited to a rotating form. For example, it is acceptable to apply an agitation member in a swinging form. Further, it is acceptable to dispose yet another agitation member besides the agitation member 60.

Further, a remaining amount detection sensor 312, serving as a sensor for detecting a toner amount in the interior of the storage portion 18, is disposed in the storage portion 18, and the remaining amount detection sensor 312 includes a light emitting portion 312*a* and a light receiving portion 312*b*. Light emitted from the light emitting portion 312*a* passes through the interior of the storage portion 18, and is received by the light receiving portion 312*b*. That is, the light emitting portion 312*a* and the light receiving portion 312*b* form a light path Q1 in the interior of the storage portion 18. To be noted, the light emitting portion 312*a* and the light receiving portion 312*b* may be disposed by arranging each of a light emitting element and a light receiving element in the interior of the storage portion 18, or it is acceptable to guide the light to the inside and outside of the storage portion 18 using light guiding portions by arranging each of the light emitting element and the light receiving element in the outside of the storage portion 18.

Further, the light emitting portion 312*a* and the light receiving portion 312*b* are disposed in a center section of the storage portion 18 in the X direction. By arranging the light emitting portion 312*a* and the light receiving portion 312*b* in the center section of the storage portion 18, it is possible to satisfactorily detect a remaining amount of the toner in the storage portion 18. That is, the developer (toner) is sometimes unevenly distributed in end portions of the storage portion 18 in the X direction, but, since an uneven distribution of the developer is less in the center section, it is possible to detect a realistic remaining amount of the toner.

To be noted, in the present embodiment, the LED is used for the light emitting portion 312*a*, and a photoresistor that is turned into an on state by the light from the LED is used for the light receiving portion 312*b*, however, it is not limited to this. For example, it is acceptable to apply a halogen lamp and a fluorescent lamp to the light emitting portion 312*a*, and acceptable to apply a photodiode and an avalanche photodiode to the light receiving portion 312*b*.

The light receiving portion 312*b* that is the photoresistor receives the light emitted from the light emitting portion 312*a*, and outputs a signal (electrical current) corresponding to a light amount of received light. This signal is converted into voltage, and input to an engine controller 130 (refer to FIG. 21). That is, the light receiving portion 312*b* changes an output value based on the amount of the toner (developer) stored in the storage portion 18.

Based on a voltage level that has been input, the engine controller 130 judges whether or not the light receiving portion 312*b* receives the light from the light emitting portion 312*a*. Based on a duration of time during which the light receiving portion 312*b* has detected each light at a time of agitating the toner in the interior of the storage portion 18 for a certain time, the engine controller 130 calculates the amount of the toner (amount of developer) in the interior of the storage portion 18. That is, a read-only memory (ROM) of the engine controller 130 has stored beforehand a table capable of outputting the remaining amount of the toner from a light reception time when the agitation member 60 has conveyed the toner, and, based on this table, the engine controller 130 estimates/calculates the remaining amount of the toner.

When the remaining amount of the toner is large, since the light path Q1 is easily blocked by the toner, the duration of the time during which the light receiving portion 312*b* receives the light is shortened. On the other hand, when the remaining amount of the toner is small, the duration of the time during which the light receiving portion 312*b* receives the light is lengthened. Therefore, as described above, the engine controller 130 can judge a level of the remaining amount of the toner in the interior of the storage portion 18 based on the light reception time of the light receiving portion 312*b*.

To be noted, a detection/estimation method of the remaining amount of the toner is not limited to the method described above, and it is possible to apply various well-known methods as the detection/estimation method of the remaining amount of the toner. For example, by arranging equal to or more than two plates or sheets of a metal plate or a conductive resin sheet extending in a longitudinal direction of the developing roller 12 on an inner wall of the storage portion 18, it is acceptable to estimate/calculate the remaining amount of the toner by measuring an electrostatic capacity between two metal plates or two conductive resin sheets. Alternatively, by disposing a load cell in a form that supports the developer container 230 from below, it is acceptable to calculate the remaining amount of the toner based on weight measured by the load cell.

Replenishment Portion

Figure 6A:
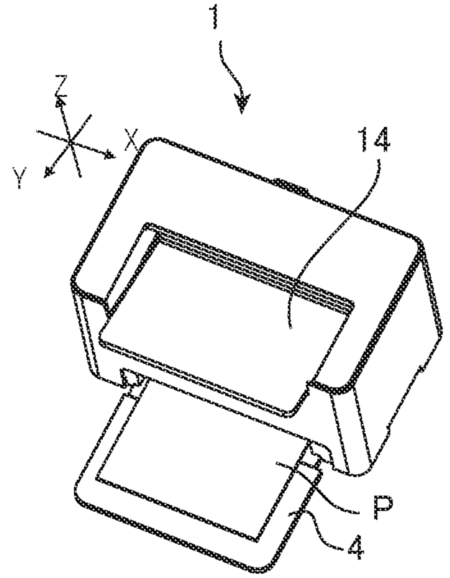
FIG. 6A is a perspective view illustrating the image forming apparatus with a sheet discharge tray closed.
Figure 6B:
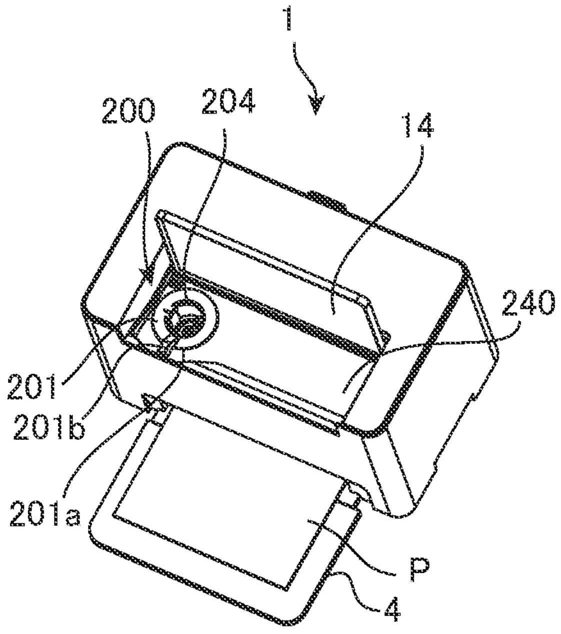
FIG. 6B is a perspective view illustrating the image forming apparatus with the sheet discharge tray opened.

Next, using FIGS. 6A to 8C, the replenishment portion 200 will be described. The sheet discharge tray 14 is supported in an openable and closable manner between a closed position, capable of loading the recording material P, as illustrated in FIG. 6A, and an opening position, opened with respect to an apparatus body of the image forming apparatus 1, as illustrated in FIG. 6B. The sheet discharge tray 14 covers the replenishment portion 200 in the closed position. When the sheet discharge tray 14 is opened to the opening position, a top surface portion 240 and the replenishment portion 200 arranged on the top surface portion 240 is exposed. The replenishment portion 200 is configured such that it is possible to attach and detach a replenishment pack 210 as illustrated in FIG. 6C, and configured such that the user and the service man can replenish the toner from the outside without detaching the developer container 230 from the casing 72.

Figure 6C:
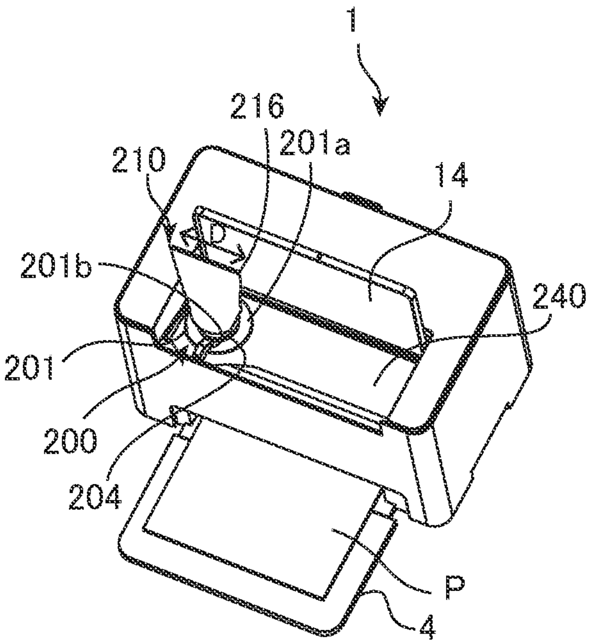
FIG. 6C is a perspective view illustrating the image forming apparatus with a replenishment pack attached to the replenishment portion.
Figure 6D:
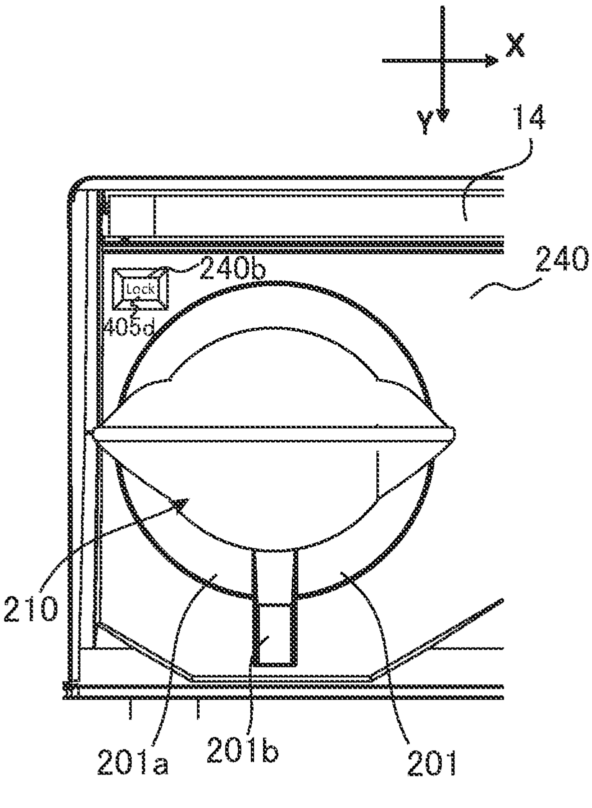
FIG. 6D is a plan view illustrating a state in which the replenishment pack is attached to the replenishment portion.

As illustrated in FIGS. 6B to 6D, the operation portion 201, serving as an operation member, is arranged on the top surface portion 240, and forms a replenishment port 204 that is a receiving port for replenishing the toner. In the X direction, the width of the replenishment port 204 is narrower than the width of the storage portion 18. Further, the operation portion 201 is disposed so as to enclose the replenishment port 204, and includes a ring portion 201*a* rotatably supported by the top surface portion 240 or the toner receiving portion 202 and a lever portion 201*b* disposed integrally with the ring portion 201*a*. The operation portion 201 is a member for manipulating an opening/closing of the apparatus body shutter portion 206 and a pack shutter portion 214 from the outside.

Figure 7A:
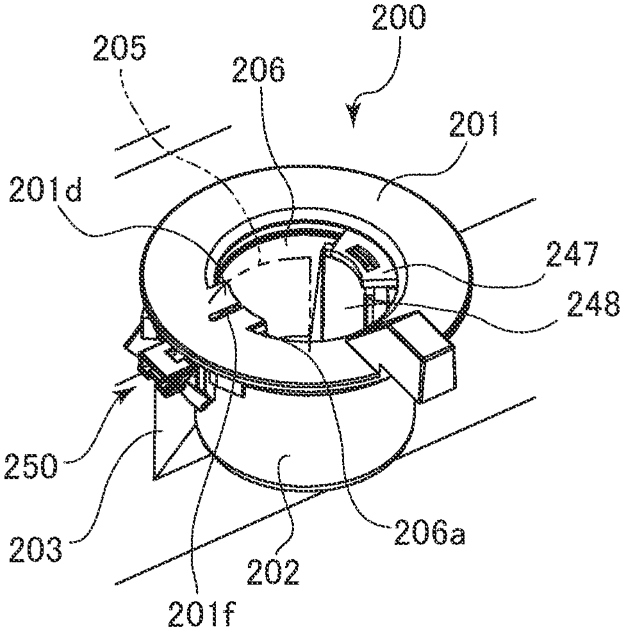
FIG. 7A is a perspective view illustrating the replenishment portion.
Figure 7B:
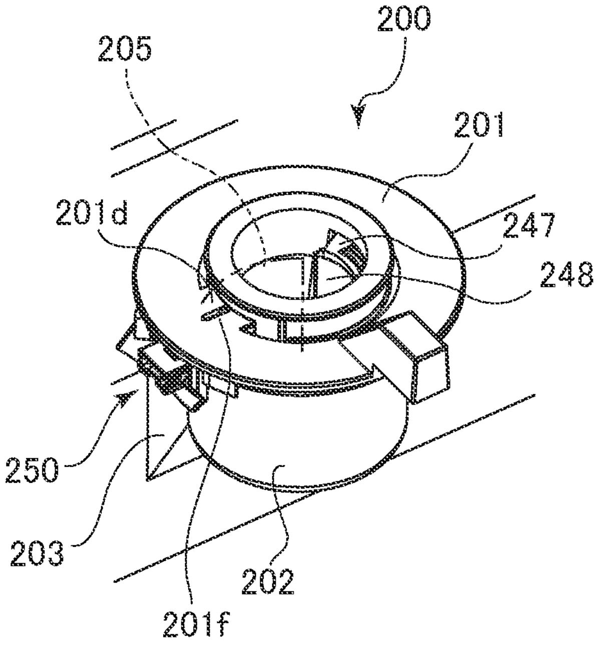
FIG. 7B is a perspective view illustrating the replenishment portion and part of the replenishment pack.

As illustrated in FIG. 7A, guide portions 247 and 248 disposed inside of the apparatus body shutter portion 206 and integrated with the toner receiving portion 202 are disposed in the toner receiving portion 202. The apparatus body shutter portion 206 is a cylindrically shaped member that is concentric with the toner receiving portion 202, and is rotatably disposed inside of the toner receiving portion 202. The apparatus body shutter portion 206 includes an opening 207 (refer to FIG. 7C), and the opening 207 and the side opening 205 of the toner receiving portion 202 are misaligned in a closed position illustrated in FIG. 7A. A seal member 243 is secured to the apparatus body shutter portion 206 so as to enclose a circumference edge portion of the opening 207.

To be noted, since the side opening 205 is covered by the apparatus body shutter portion 206 positioned in the closed position, the side opening 205 is shown by dashed lines in FIG. 7A. Therefore, the side opening 205 is shielded by the apparatus body shutter portion 206, and the toner is not discharged to the replenishment path portion 203. When the replenishment pack 210 is not attached, the operation portion 201 is regulated in a rotational direction by a first lock mechanism 250, described below. By this first lock mechanism 250, before attaching the replenishment pack 210, it is possible to prevent inability to attach the replenishment pack 210 due to a phase misalignment between an operation portion drive transmission projection 201*d* and an apparatus body shutter portion drive transmission projection 206*a*.

Figure 7C:
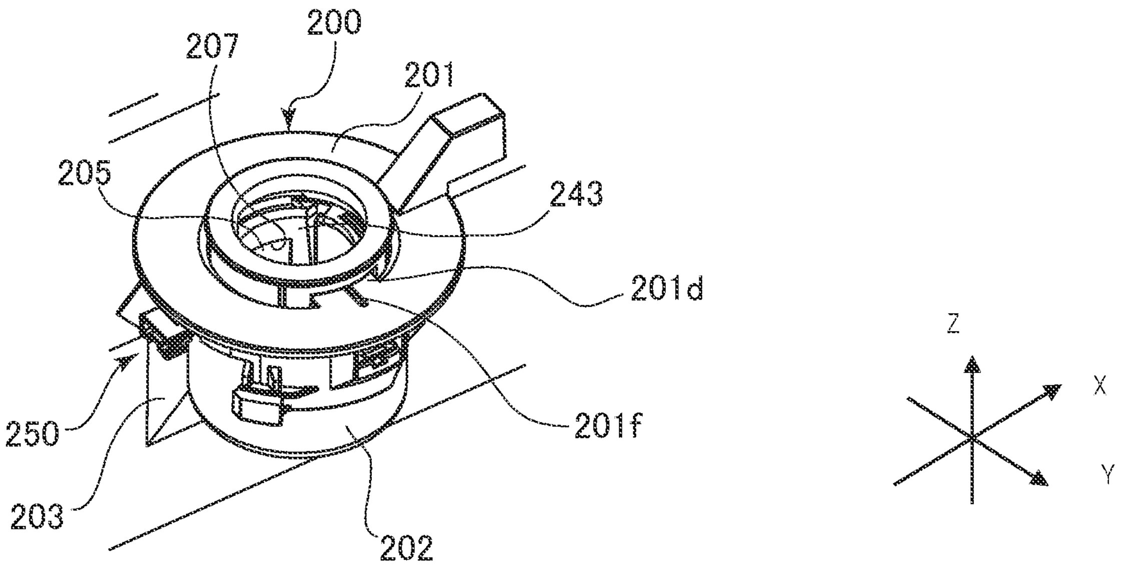
FIG. 7C is a perspective view illustrating the replenishment portion at a time when an operation portion is positioned in a replenishing position.

Further, when the apparatus body shutter portion 206 is positioned in an opening position illustrated in FIG. 7C, the opening 207 overlaps the side opening 205 of the toner receiving portion 202. Therefore, it is possible to discharge the toner, replenished from the replenishment pack 210 (refer to FIG. 6C) attached to the replenishment portion 200, to the replenishment path portion 203 via the side opening 205 and the opening 207.

The apparatus body shutter portion drive transmission projection 206*a* is disposed to the apparatus body shutter portion 206, and, while details will be described below, the apparatus body shutter portion drive transmission projection 206*a* is used for receiving drive from the replenishment pack 210 so as to pivot the apparatus body shutter portion 206. By rotationally manipulating the operation portion 201 with the replenishment pack 210 attached to the replenishment portion 200, the apparatus body shutter portion 206 moves between the closed position and the opening position.

The operation portion drive transmission projection 201*d* that projects more inwardly in a radial direction than an inner circumferential surface of the toner receiving portion 202 is disposed to the operation portion 201. The operation portion drive transmission projection 201*d* is engaged with the apparatus body shutter portion drive transmission projection 206*a* via a pair of drive transmission surfaces 214*b* (refer to FIG. 9B) of the pack shatter portion 214 of the replenishment pack 210. A lock release concave portion 201*f*, described below, is disposed to the apparatus body shutter portion drive transmission projection 206*a*. When the user rotates the lever portion 201*b* of the operation portion 201 by 90 degrees in a counter-clockwise direction, the apparatus body shutter portion drive transmission projection 206*a* moves from the closed position illustrated in FIG. 7A to the open position illustrated in FIG. 7C.

At a time of forming the image on the recording material P, it is necessary to block the side opening 205 by the apparatus body shutter portion 206 such that the toner does not leak from the side opening 205 because of the agitation of the toner in the interior of the storage portion 18 by the agitation member 60 (refer to FIG. 5). Therefore, at the time of forming the image, the operation portion 201 is positioned in an operating position illustrated in FIG. 7A so as to position the apparatus body shutter portion 206 in the closed position. On the other hand, at a time of replenishing the toner from the replenishment pack 210, described below, it is necessary to open the side opening 205. Therefore, at the time of replenishing the toner, the operation portion 201 is positioned in a replenishing position illustrated in FIG. 7C so as to position the apparatus body shutter portion 206 in the opening position.

Figure 8A:
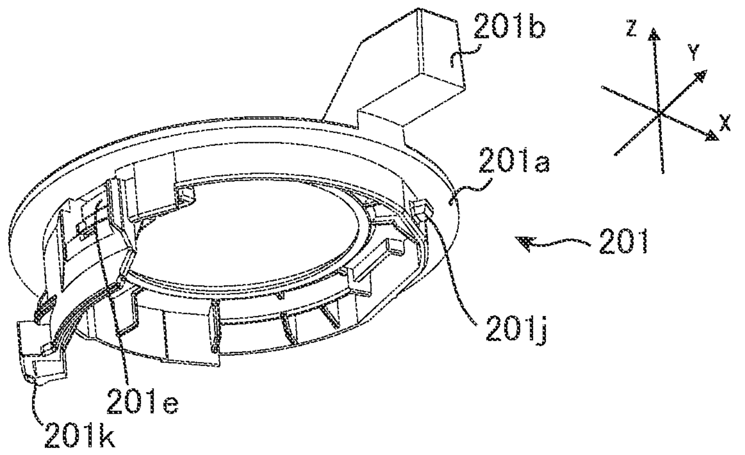
FIG. 8A is a perspective view illustrating the operation portion.
Figure 8B:
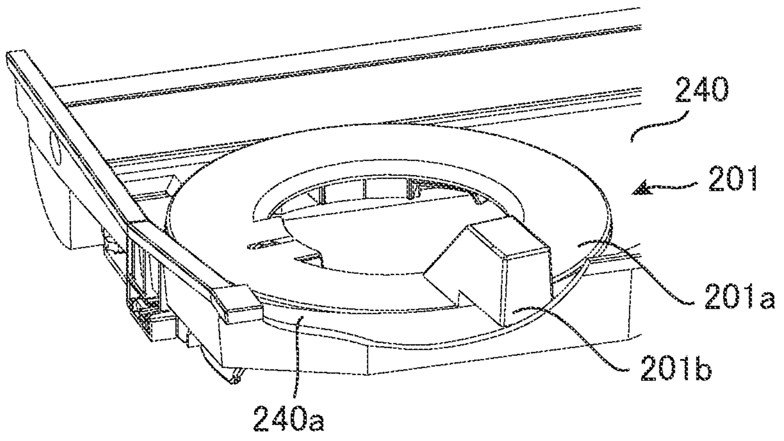
FIG. 8B is a perspective view illustrating the operation portion and a top surface portion.

As illustrated in FIG. 8B, the operation portion 201 is rotatably supported by a support portion 240*a* of the top surface portion 240. As illustrated in FIG. 8A, the operation portion 201 includes a retaining portion 201*j*, an engaged portion 201*k*, and an opening portion 201*e*. In the rotational direction of the operation portion 201, the retaining portion 201*j* is arranged substantially in the same position as the lever portion 201*b*, and the engaged portion 201*k* is arranged in a position different from the retaining portion 201*j*. It is possible to insert a lever lock press portion 227*a* of a lever lock member 227, described below, into the opening portion 201*e*. By inserting the lever lock press portion 227*a* into the opening portion 201*e*, the operation portion 201 is regulated in the rotation in a state of being positioned in the operating position.

Figure 8C:
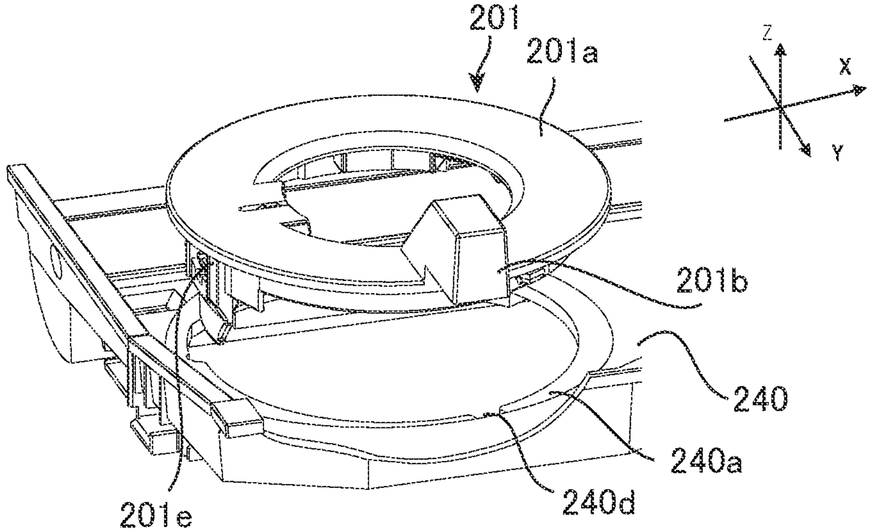
FIG. 8C is a perspective view illustrating how the operation portion is attached to the top surface portion.

As illustrated in FIG. 8C, the operation portion 201 is attached with respect to the support portion 240*a* by positioning the retaining portion 201*j* to a groove portion 240*d* disposed in the support portion 240*a*. To be noted, at a time when the operation portion 201 is positioned in the operating position or the replenishing position, the retaining portion 201*j* and the groove portion 240*d* are positioned in positions not overlapping each other when viewed in a rotational axis direction of the operation portion 201. Further, in a range in which the operation portion 201 pivots between the operating position and the replenishing position, the retaining portion 201*j* and the groove portion 240*d* do not overlap each other when viewed in the rotational axis direction of the operation portion 201. That is, at a time when the operation portion 201 is manipulated between the operating position and the replenishing position, the operation portion 201 is retained with respect to the support portion 240*a* of the top surface portion 240.

Replenishment Pack

Figure 9A:
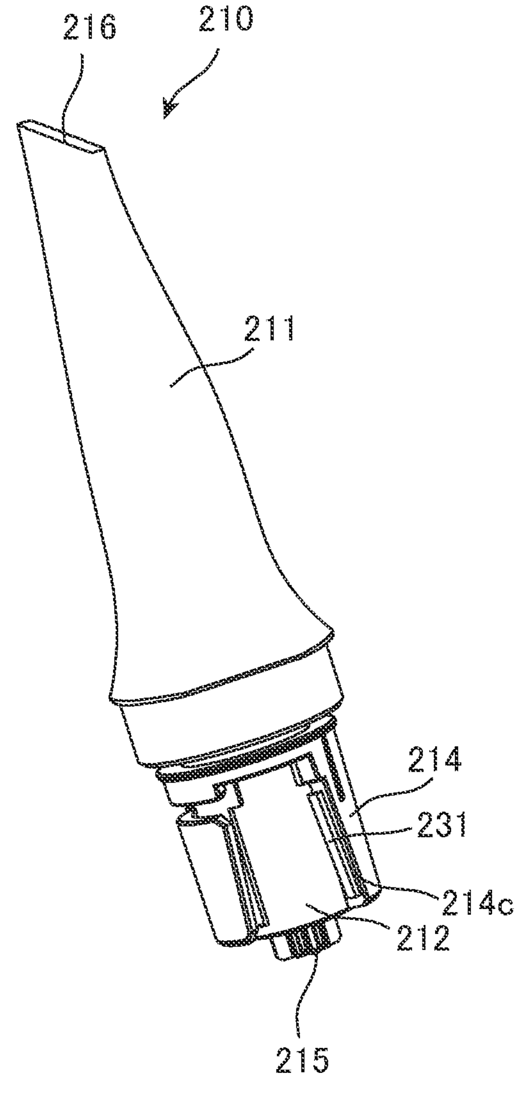
FIG. 9A is a perspective view illustrating the replenishment pack at a time when a pack shutter portion is positioned in a closed position.
Figure 9B:
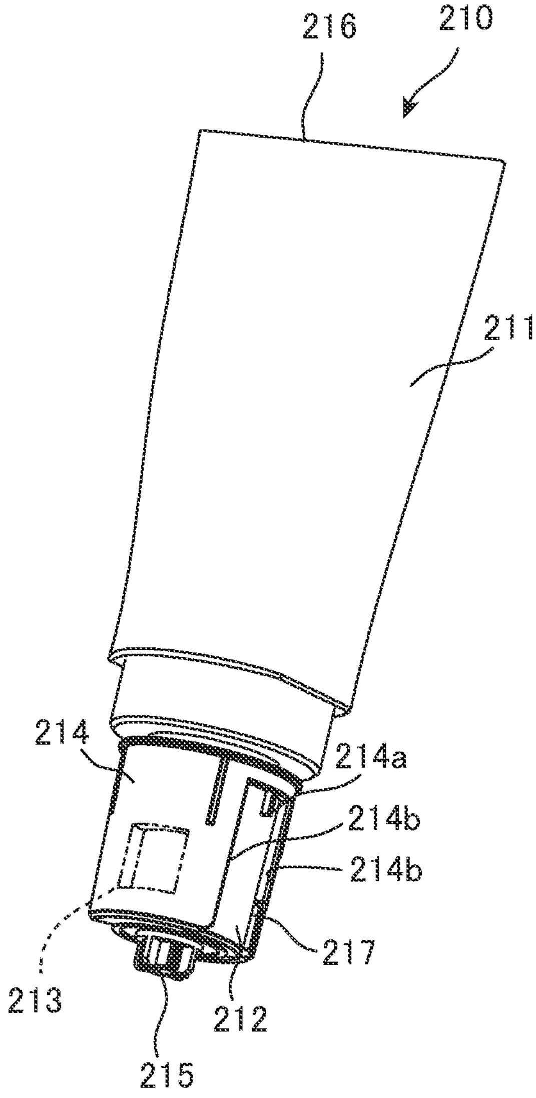
FIG. 9B is a perspective view illustrating the replenishment pack at the time when the pack shutter portion is positioned in the closed position.
Figure 10A:
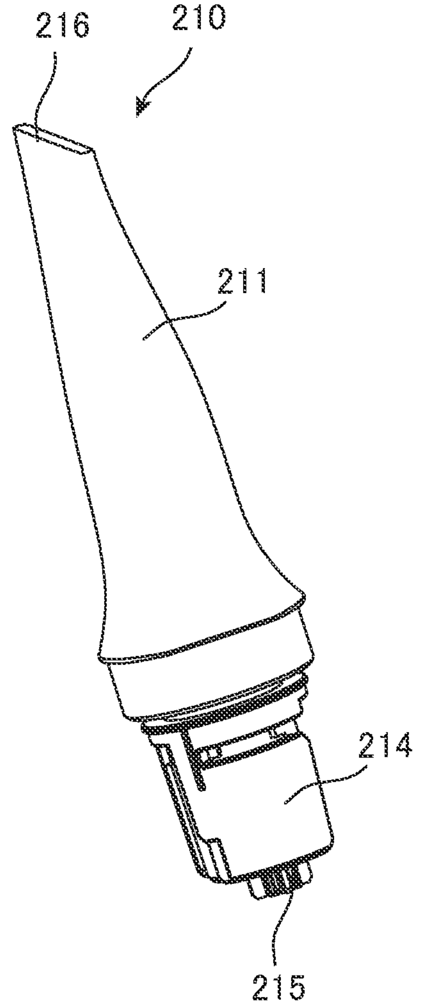
FIG. 10A is a perspective view illustrating the replenishment pack at a time when the pack shutter portion is positioned in an opening position.
Figure 10B:
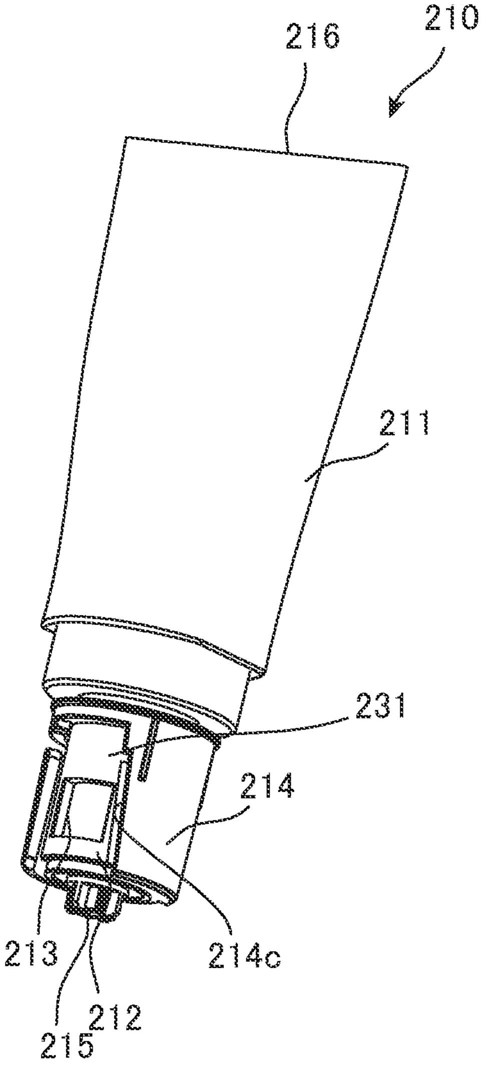
FIG. 10B is a perspective view illustrating the replenishment pack at the time when the pack shutter portion is positioned in the opening position.
Figure 11A:
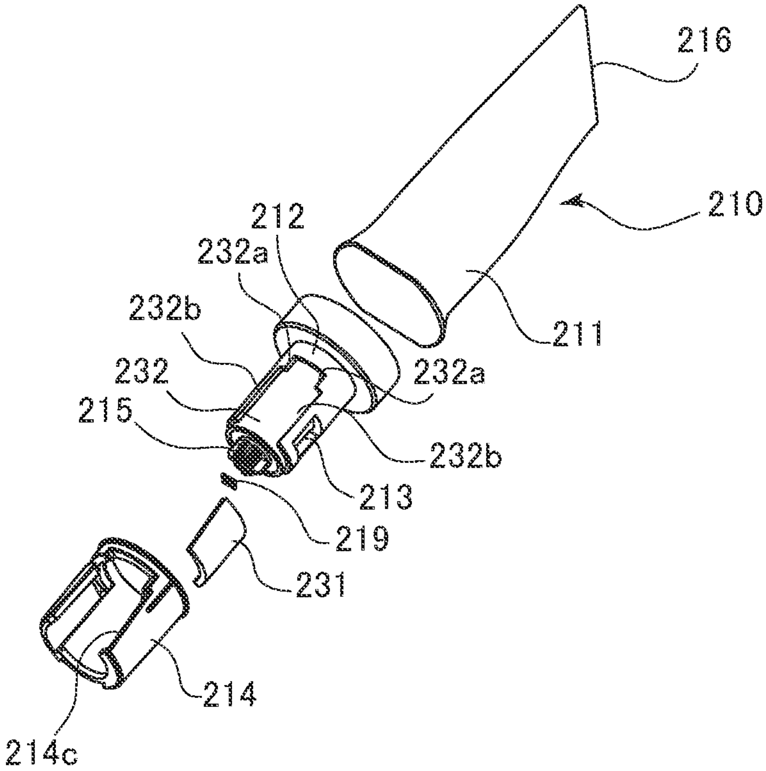
FIG. 11A is an exploded perspective view illustrating the replenishment pack.
Figure 11B:
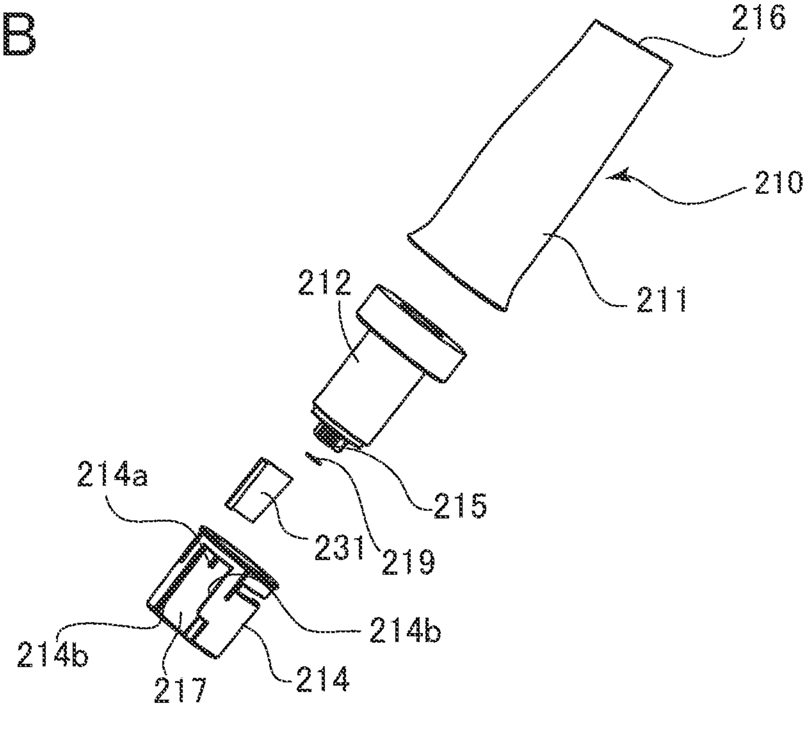
FIG. 11B is the other exploded perspective view illustrating the replenishment pack.

Next, using FIGS. 9A to 11B, a configuration of the replenishment pack 210 will be described. FIGS. 9A and 9B are perspective views illustrating the replenishment pack at a time when the pack shutter portion 214 is positioned in a closed position. FIGS. 10A and 10B are illustrating the replenishment pack at a time when the pack shatter portion 214 is positioned in an opening position. FIGS. 11A and 11B are exploded perspective views illustrating the replenishment pack.

The replenishment pack 210, serving as a toner container, includes a pouch portion 211, serving as a bag containing the toner for replenishment, a cylindrically shaped insertion portion 212 that is inserted into the replenishment port 204, and the pack shutter portion 214, serving as a container shutter. The insertion portion 212, serving as a nozzle portion, communicates with the pouch portion 211. An opening 213, serving as an opening through which the toner in an interior of the pouch portion 211 is discharged outside, is formed in the insertion portion 212. To be noted, while the pouch portion 211 is constituted from a plastic bag body that is easily deformed, it is not limited to this. For example, the pouch portion 211 may be constituted from a resin bottle container and from containers made of paper and vinyl.

Further, a holding portion 215 is disposed at a tip portion of the insertion portion 212, and a pouch end portion 216 is formed at an end opposite to the insertion portion 212. The pouch portion 211 has a flat shape toward the pouch end portion 216, and the pouch end portion 216 extends in a radial direction perpendicular to a rotational axis direction of the pack shutter portion 214.

The pack shutter portion 214 is a cylindrical member that is concentric with the insertion portion 212, and disposed outside in a radial direction of the insertion portion 212. The pack shutter portion 214 includes an opening 214*c*, and, by rotating with respect to the insertion portion 212, can make transition between the closed position that shields the opening 213 of the insertion portion 212 and the opening position that opens the opening 213. When the opening 214*c* of the pack shutter portion 214 overlaps the opening 213 of the insertion portion 212, it is possible to replenish the toner from the replenishment pack 210 to the replenishment portion 200.

Further, a seal member 231 capable of sliding and rubbing an outer circumferential surface of the insertion portion 212 is secured to an inner circumferential surface of the pack shutter portion 214, and the seal member 231 shields the opening 213 of the insertion portion 212 at a time when the pack shutter portion 241 is positioned in the closed position.

As illustrated in FIG. 11A, a guided portion 232 that is recessed from the outer circumferential surface of the insertion portion 212 is formed in the insertion portion 212, and the guided portion 232 includes one pair each of first guided portions 232*a* and second guided portions 232*b*. When the replenishment pack 210 is attached to the replenishment portion 200, guide portions 247 and 248 integrated with the toner receiving portion 202 are inserted into the guided portion 232. Thereby, a relative movement between the insertion portion 212 and the toner receiving portion 202 in a circumferential direction around the rotational axis of the pack shutter 214 as a center is regulated by each other.

Further, as illustrated in FIG. 11B, an outer circumferential surface of the pack shutter portion 214 includes a positioning portion 217 engaging with the operation portion 201 and the drive transmission surfaces 214*b* facing across the positioning portion 217. That is, on the outer circumferential surface of the pack shatter portion 214, a groove shape (concave portion that is recessed inwardly in the radial direction of the pack shatter portion 214) in which the positioning portion 217 serves as a groove bottom surface and the drive transmission surfaces 214*b* serve as groove side surfaces are formed. This groove portion is open at an end portion of the outer circumferential surface of the pack shutter portion 214 in an insertion direction of the insertion portion 212. When the drive transmission surfaces 214*b* receive force from the operation portion drive transmission projection 201*d* of the operation portion 201 in the circumferential direction, the pack shutter portion 214 rotates with respect to the insertion portion 212. A lever lock release rib 214*a* that releases the first lock mechanism 250, described below, of the operation portion 201 is disposed between the drive transmission surfaces 214*b*. By disposing the lever lock release rib 214*a* between the drive transmission surfaces 214*b*, at a time of attaching the replenishment pack 210, it is possible to accurately release the first lock mechanism 250 of the operation portion 201.

Further, as illustrated in FIGS. 11A and 11B, a memory tag 219, serving as a memory, is held at the holding portion 215 disposed at the tip of the insertion portion 212. The memory tag 219 stores predetermined authentication information.

At a time when the pack shutter portion 214 is positioned in the closed position, the insertion portion 212 is brought into a state in which the opening 214*c* disposed in the pack shutter portion 214 and the guided portion 232 disposed in a manner of being recessed from the outer circumferential surface of the insertion portion 212 overlap each other in a rotational phase in the circumferential direction.

In this state, the guide portions 247 and 248 of the replenishment portion 200 are inserted into the guided portion 232 of the replenishment pack 210, and the opening 214*c* is brought into a state of engaging with a circumference edge of the seal member 243 disposed on the inner circumferential surface of the apparatus body shutter member 206. In the state where the replenishment pack 210 is attached to the replenishment portion 200, in the guided portions 232, the first guided portions 232*a* on an upstream side in an insertion direction are brought into a state of engaging with the guide portion 247, and the second guided portions 232*b* on a downstream side are brought into a state of facing the guide portion 248. A surface, which is a step portion between the first and second guided portions 232*a* and 232*b* and extends in the circumferential direction engages with respect to a surface, which is a step portion between the guide portions 247 and 248 and extends in the circumferential direction, in the insertion direction, and determines a position between the insertion portion 212 and the operation portion 212 in the insertion direction. The opening 214*c* has a shape of widening toward the tip side of the insertion portion 212 and opening in a notched shape. A pair of facing portions that form the opening 214*c* and face each other in the circumferential direction are brought into a state of sandwiching the seal member 243 in the circumferential direction.

In conjunction with engaging with the operation portion drive transmission projection 201*d* of the operation portion 201, the drive transmission surfaces 214*b* of the pack shutter portion 214 engage with the apparatus body shutter portion drive transmission projection 206*a* of the apparatus body shutter portion 206. In conjunction with being moved (rotated) by the operation (motion) force of the operation portion 201, the pack shutter portion 214 moves the apparatus body shutter portion 206 by transmitting the operation force. That is, as a force receiving region, the drive transmission surface 214*b* includes a region for engaging with and coming into contact with the operation portion drive transmission projection 201*d*. The operation portion drive transmission projection 201*d* has a shape of a projecting portion extending inwardly from the inner circumferential surface of the operation portion 201 in the radial direction, and, as a force applying region, the drive transmission surface 214*b* has a region for engaging with and coming into contact with the apparatus body shutter portion drive transmission projection 206*a*.

Description of First Lock Mechanism

With reference to FIGS. 7A to 7C and FIGS. 12A to 13B, the first lock mechanism 250 will be described. As illustrated in FIGS. 7A to 7C and FIG. 12B, the first lock mechanism 250 includes the lever lock member 227, a lever lock release link 229, and a pressing spring 228. The lever lock release link 229 includes a contact surface 229*b* that comes into contact with the lever lock member 227, and the lever lock member 227, serving as a second regulation member, is pressed to the contact surface 229*b* by the pressing spring 228. At a time when the replenishment pack 210 is not attached, the operation portion 201 is regulated in the rotational direction by the first lock mechanism 250, and is in the operating position, serving as an initial position.

Figure 12A:
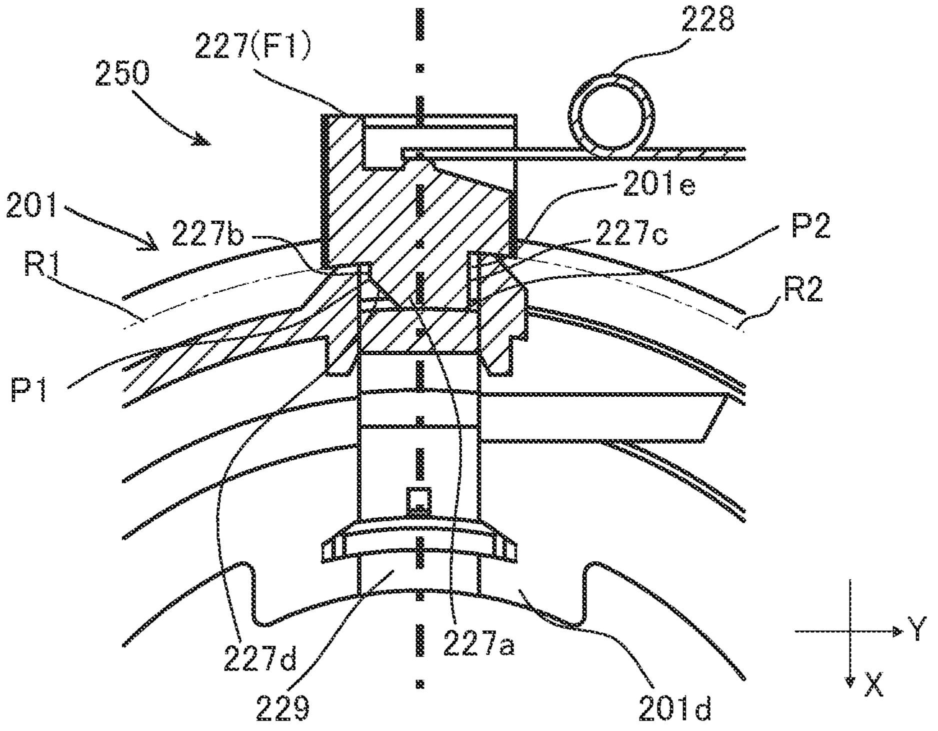
FIG. 12A is a bottom view illustrating a first lock mechanism that is in a lock state.
Figure 12B:
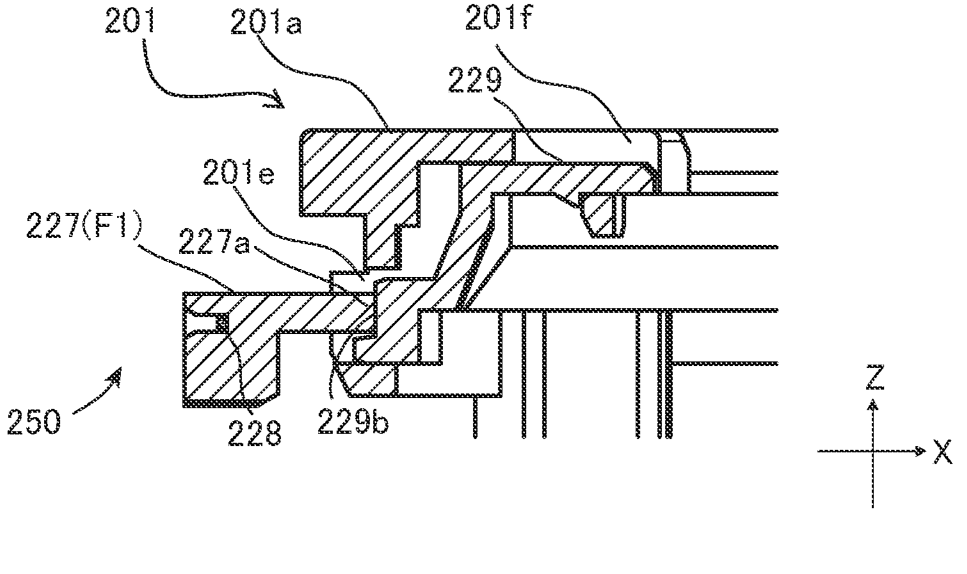
FIG. 12B is a cross-sectional view illustrating the first lock mechanism that is in the lock state.

At a time when the lever lock member 227 is locked by being positioned in a regulation position F1, serving as a second regulation position, a bottom view and a cross-sectional view of the operation portion 201 and the first lock mechanism 250 are respectively illustrated in FIGS. 12A and 12B. At a time when the lever lock member 227 is unlocked by being positioned in a release position F2, serving as a second regulation release position, a bottom view and a cross-sectional view of the operation portion 201 and the first lock mechanism 250 are respectively illustrated in FIGS. 13A and 13B.

As illustrated in FIGS. 12A and 12B, in a case where the first lock mechanism 250 is in a lock state, the lever lock member 227 is pressed by the pressing spring 228 and positioned in the regulation position F1. Then, the lever lock press portion 227*a* of the lever lock member 227 is inserted into the opening portion 201*e* of the operation portion 201. When the operation portion 201 is pivoted in that state, as illustrated in FIG. 12A, an inner wall of the opening portion 201*e* pivots along pivot loci R1 and R2. P1 indicates a switching portion between a rotation regulation surface 227*b* and an inclined surface 227*d*, and P2 indicates a switching portion of a rotation regulation surface 227*c*. In the case where the first lock mechanism 250 is in the lock state, P1 and P2 are disposed so as to be located inside of the pivot loci R1 and R2. Therefore, the inner wall of the opening portion 201*e* comes into contact with and locks the rotation regulation surfaces 227*b* and 227*c* that are surfaces perpendicular with respect to the rotational direction, and a pivot of the operation portion 201 is regulated. That is, the lever lock member 227 regulates the movement of the operation portion 201 in the regulation position F1.

Figure 13A:
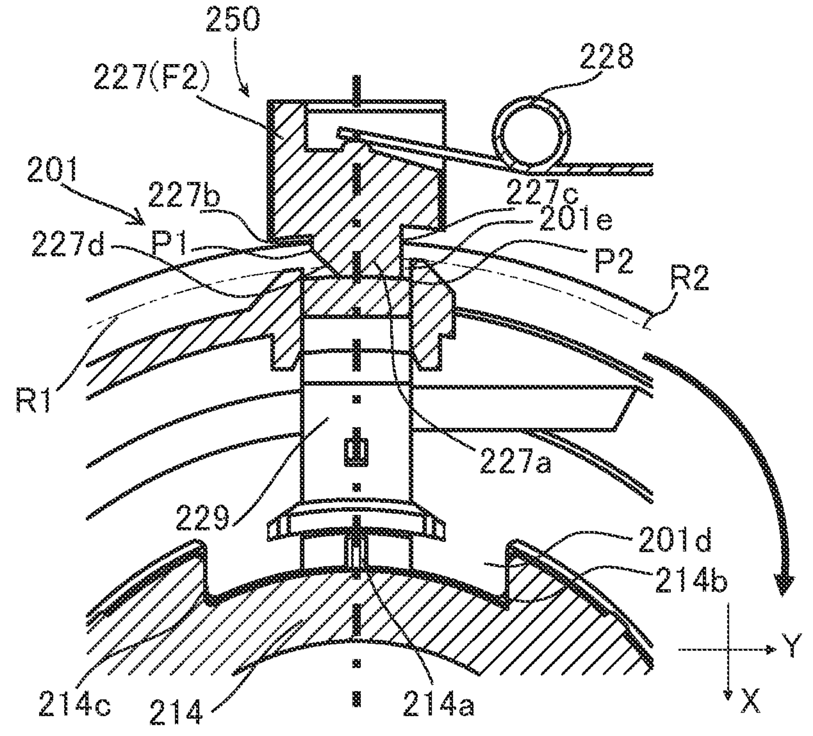
FIG. 13A is a bottom view illustrating the first lock mechanism that is in an unlock state.
Figure 13B:
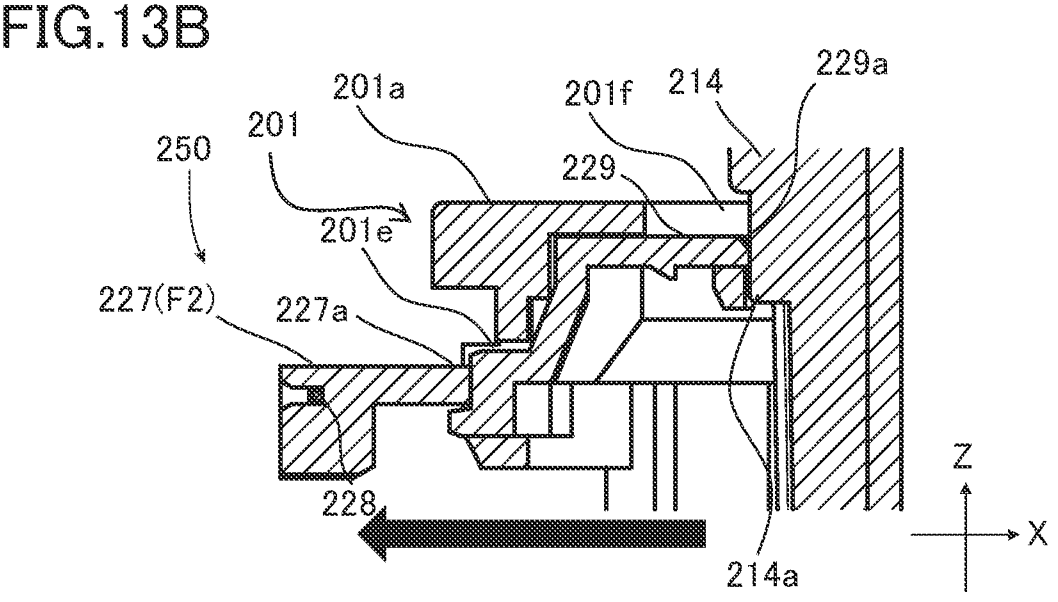
FIG. 13B is a cross-sectional view illustrating the first lock mechanism that is in the unlock state.

As illustrated in FIGS. 13A and 13B, when the replenishment pack 210 is attached, the lever lock release rib 214*a* passes through the lock release concave portion 201*f*, and comes into contact with the lever lock release link 229. The lever lock release link 229 includes an inclined surface shape 229*a* that comes into contact with the lever lock release rib 214*a*. The lever lock release link 229 receives force, for moving the lever lock member 227 from the regulation position F1 to the release position F2, from the pack shutter portion 214 through contact between the inclined surface shape 229*a* and the lever lock release rib 214*a*. The inclined surface shape 229*a* has a shape of being inclined with respect to the insertion direction of the replenishment pack 210 into the operation portion 201. That is, the inclined surface shape 229*a* is configured to be inclined such that a component force that acts in a direction of moving the lever lock release link 229 to a pressing position is included in force received from the lever lock release rib 214*a*.

As illustrated in FIG. 13B, the lever lock release link 229 is brought into a state in which the inclined surface shape 229*a* is pressed in an arrow direction by the force received from the lever lock release rib 214*a* and an end portion, on which the inclined surface portion 229*a* is disposed, rides on a side surface of the lever lock release rib 214*a*. Thereby, the lever lock release link 229 moves to the pressing position in which the contact surface 229*b* moves the lever lock member 227 to the release position F2. Thereby, while resisting against the urging force of the pressing spring 228, the lever lock member 227 that is in contact with the lever lock release link 229 moves to the release position F2 in the arrow direction.

As illustrated in FIG. 13A, when the lever lock member 227 is positioned in the release position F2, P1 moves outside of the pivot locus R1, and P2 is retained inside of the pivot locus R2. Therefore, when the lever portion 201*b* is pivoted in the arrow direction, the inclined surface 227*d* comes into contact with the inner wall of the opening portion 201*e*, and, by the component force, the lever lock member 227 can ride over the inclined surface 227*d* by receding further outward than the release position F2 in the radial direction. Therefore, by allowing the lever portion 201*b* to pivot in the arrow direction, the lever lock member 227 can pivot the operation portion 201 to the replenishing position.

When the lever lock member 227 is positioned in the release position F2, since P2 is retained inside of R2, a pivot of the lever portion 201*b* in a direction opposite to an arrow direction in FIG. 13A is regulated. That is, the lever lock member 227 releases regulation on the movement of the operation portion 201 in the release position F2. In the present embodiment, by disposing an assembly phase of the operation portion 201 in a direction in which the pivot is regulated, after assembly, the operation portion 201 is prevented from pivoting to the assembly phase, while, simultaneously, being allowed to pivot to the replenishing position.

Procedure for Replenishing Toner

Next, using FIGS. 6A to 14, a procedure for replenishing the toner using the replenishment pack 210 will be described. First, as illustrated in FIGS. 6A to 6C, the user detaches the recording material P on the sheet discharge tray 14, and opens the sheet discharge tray 14 from the closed position to the opening position. Thereby, the replenishment portion 200 is exposed. Since the replenishment portion 200 is disposed on an upper front surface of the image forming apparatus 1, it is easy to perform the replenishment of the toner.

In a state where the sheet discharge tray 14 is opened to the opening position and the replenishment portion 200 is exposed, the pivot of the operation portion 201 is regulated by the first lock mechanism 250 described above. Then, the operation portion 201 is positioned in the operating position.

Then, the user attaches the replenishment pack 210 to the replenishment portion 200 by aligning the operation portion drive transmission projection 201*d* (refer to FIG. 7A) disposed to the replenishment portion 200 with the positioning portion 217 (refer to FIG. 11B) disposed in the replenishment pack 210. It is configured such that, in a case where positions of the operation portion drive transmission projection 201*d* and the positioning portion 217 do not match, the replenishment pack 210 interferes with the operation portion drive transmission projection 201*d* and the insertion of the replenishment pack 210 is not allowed.

FIG. 6C is a perspective view illustration a state in which the replenishment pack 210 is attached to the replenishment portion 200. In the present embodiment, as illustrated in FIG. 6C, at a time when an arrow D direction that is an extending direction of the pouch end portion 216 is parallel to the X direction, it is possible to attach the replenishment pack 210 to the replenishment portion 200. When the replenishment pack is inserted to the back of the replenishment portion 200, the drive transmission surfaces 214*b* forming the positioning portion 217 engage with the operation portion drive transmission projection 201*d* of the operation portion 201. Further, the drive transmission surfaces 214*b* of the pack shutter portion 214 engage with the apparatus body shutter portion drive transmission projection 206*a*.

That is, the rotation of the operation portion 201 is transmitted to the pack shutter portion 214, and the rotation of the pack shutter portion 214 is transmitted to the apparatus body shutter portion 206. Thereby, the apparatus body shutter portion 206 and the pack shutter portion 214 are brought into an integrated state by engaging with each other, and the pack shutter portion 214 and the apparatus body shutter portion 206 are interlocked. Further, when the replenishment pack 210 is attached to the replenishment portion 200, the lock of the operation portion 201 by the first lock mechanism 250 is released, and the operation portion 201 becomes rotatable. To be noted, in a state in which the replenishment pack 210 is not attached to the replenishment portion 200, the operation portion 201 and the apparatus body shutter portion 206 are not interlocked with each other.

Figure 14:
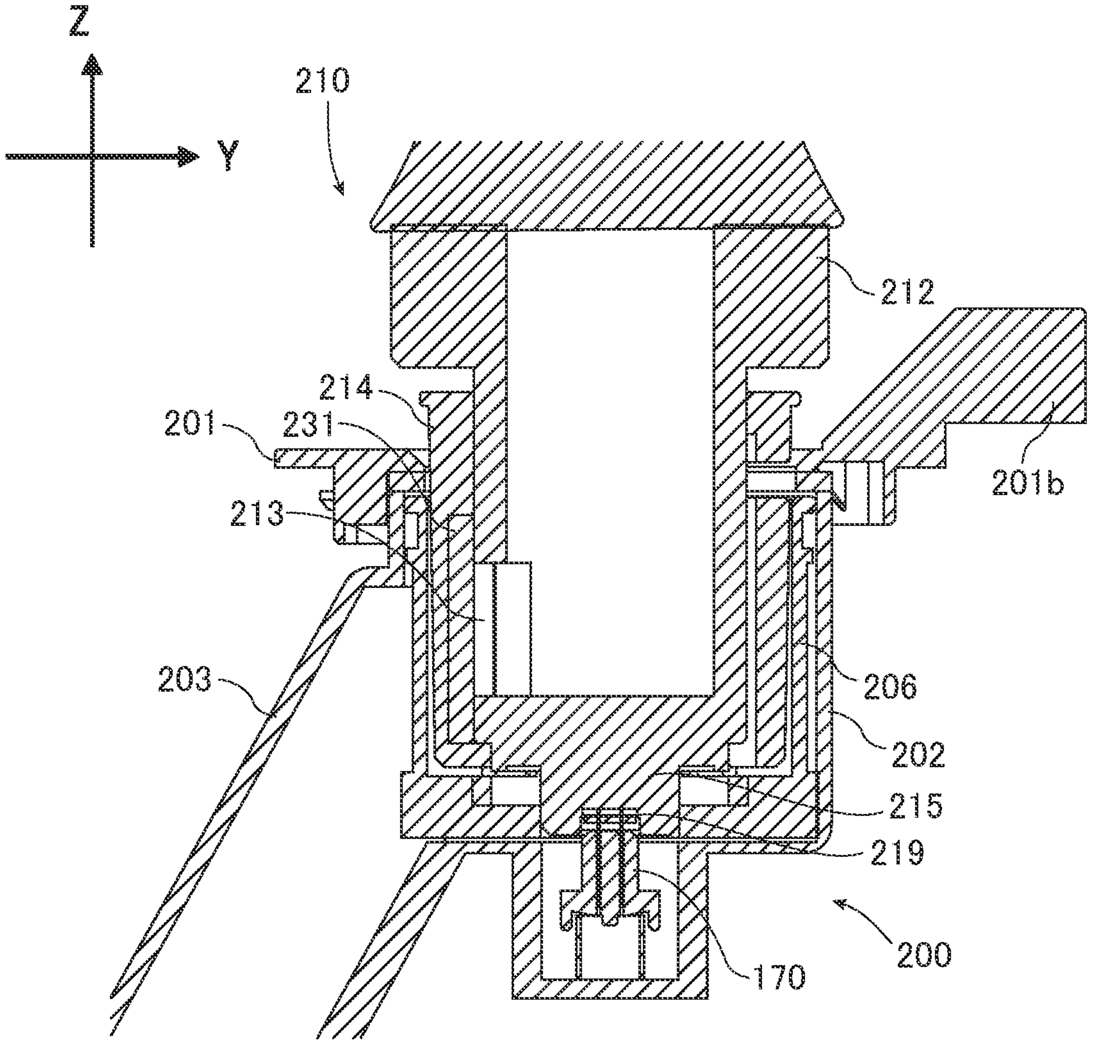
FIG. 14 is a cross-sectional view illustrating a state in which the replenishment pack is attached to the replenishment portion.
Figure 15:
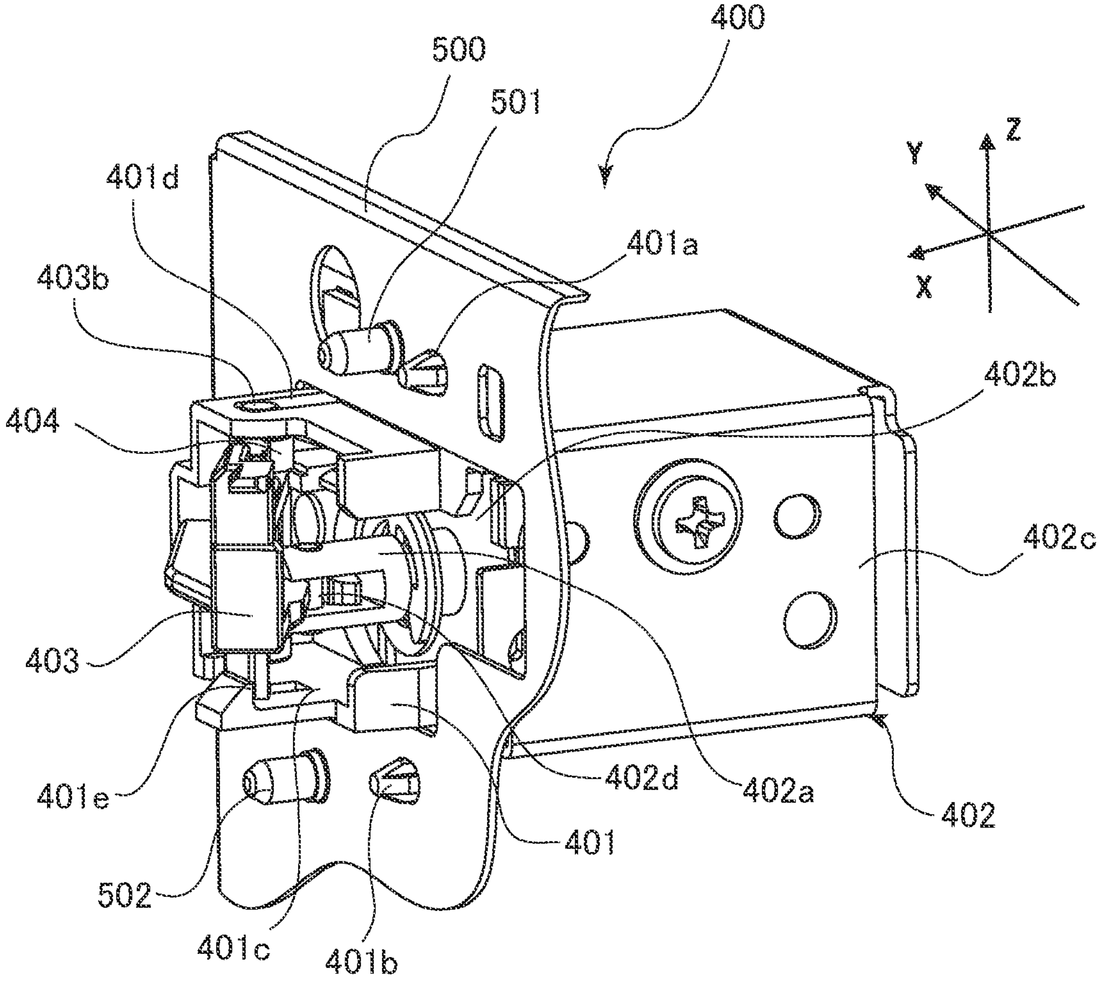
FIG. 15 is a perspective view illustrating a second lock mechanism.
Figure 16A:
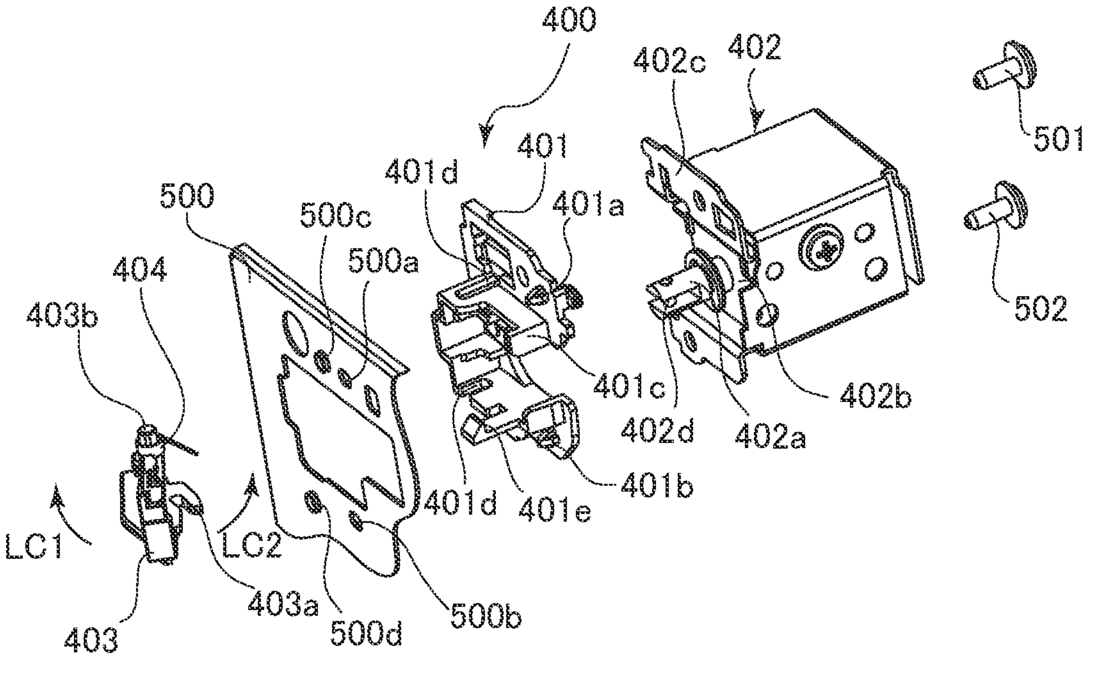
FIG. 16A is an exploded perspective view illustrating the second lock mechanism.
Figure 16B:
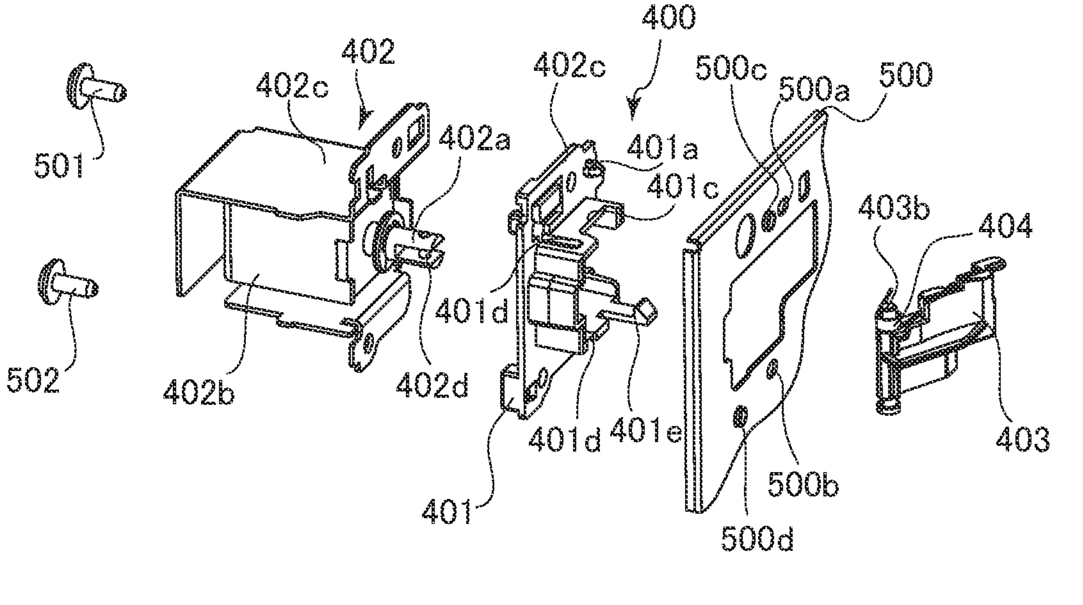
FIG. 16B is the other exploded perspective view illustrating the second lock mechanism.

FIG. 14 is a cross-sectional view illustrating the state in which the replenishment pack 210 is attached to the replenishment portion 200. In FIG. 14, the operation portion 201 is positioned in the operating position, and the apparatus body shutter portion 206 and the pack shutter portion 214 are positioned in the closed position. As illustrated in FIG. 14, an apparatus body contact 170, serving as an electrical contact, is disposed in the toner receiving portion 202. When the replenishment pack 210 is attached to the back of the replenishment portion 200, the memory tag 219 secured to the tip of the replenishment pack 210 comes into electrical contact with the apparatus body contact 170. Thereby, the apparatus body contact 170 communicates with the memory tag 219, and can read the authentication information as a predetermined information of the memory tag 219.

Then, as illustrated in FIG. 7C, the user rotates the lever portion 201*b* of the operation portion 201 by 90 degrees in a counter-clockwise direction. Thereby, the operation portion 201 rotates from the operating position to the replenishing position, and the pack shutter portion 214 and the apparatus body shutter portion 206 rotate from the closed position to the opening position. As a result, the opening 214*c* of the pack shutter portion 214, the opening 213 of the insertion portion 212 of the replenishment pack 210, the opening 207 of the apparatus body shutter portion 206, and the side opening 205 of the toner receiving portion 202 overlap. Thereby, the toner in the interior of the replenishment pack 210 is discharged to the storage portion 18 by passing through the replenishment path portion 203.

In other words, when the operation portion 201 is positioned in the replenishing position, the replenishment portion 200 is brought into a replenishable state in which it is possible to replenish the toner from the replenishment pack 210 to the storage portion 18. At this time, the opening 213 of the replenishment pack 210 and the side opening 205 of the toner receiving portion 202 communicate.

When the replenishment of the toner from the replenishment pack 210 to the storage portion 18 has been completed, the user returns the operation portion 201 from the replenishing position to the operating position. That is, the user rotates the lever portion 201*b* of the operation portion 201 by 90 degrees in a clockwise direction. Thereby, the pack shutter portion 214 and the apparatus body shutter portion 206 rotate from the opening position to the closed position.

In other words, when the operation portion 201 is positioned in the operating position, the replenishment portion 200 is brought into a non-replenishable state in which it is impossible to replenish the toner from the replenishment pack 210 to the storage portion 18. At this time, the opening 213 of the replenishment pack 210 and the side opening 205 of the toner receiving portion 202 do not communicate with each other.

Then, the user detaches the replenishment pack 210 from the replenishment portion 200. As described above, since, in a state in which the replenishment pack 210 is detached from the replenishment portion 200, the pack shutter portion 214 is positioned in the closed position, it is possible to prevent the leakage of the toner from the opening 213 of the replenishment pack 210.

Description of Second Lock Mechanism

Next, with reference to FIGS. 15 to 25B, a second lock mechanism 400 will be described. In the present embodiment, the operation portion 201 is regulated in the rotation by the second lock mechanism 400 in addition to the first lock mechanism 250. The first lock mechanism 250 regulates the rotation of the operation portion 201 in the state in which the replenishment pack 210 is not attached to the replenishment portion 200. Even in the state in which the replenishment pack 210 is attached to the replenishment portion 200, the second lock mechanism 400 regulates the rotation of the operation portion 201 under predetermined conditions.

As illustrated in FIGS. 15 to 17B, the second lock mechanism 400 is secured to a side plate 500 that is a frame member of the image forming apparatus 1. To be noted, in FIGS. 15 to 17B, only part of the side plate 500 is shown. The second lock mechanism 400 includes a holding member 401 secured to the side plate 500, a solenoid unit 402, a lock lever 403, a lock spring 404, and a display member 405 (refer to FIG. 18A).

The holding member 401 includes positioning portions 401*a* and 401*b* and a holding portion 401*c* holding the lock lever 403, and, by inserting the positioning portions 401*a* and 401*b* into holes 500*a* and 500*b* of the side plate 500, is positioned with respect to the side plate 500. The solenoid unit 402 includes a plunger 402*a*, a solenoid 402*b* that can draw the plunger 402*a* by being energized, and a solenoid frame 402*c*. The solenoid frame 402*c* holds the solenoid 402*b*, serving as an actuator.

The holding member 401 and the solenoid frame 402*c* are secured with respect to the side plate 500 by being fastened together with screws 501 and 502 with respect to fixation holes 500*c* and 500*d* of the side plate 500. The lock lever 403, serving as a regulation member and a first regulation member, includes a lock portion 403*a* that is locked to a pin 402*d* of the plunger 402*a*, and is rotatably held with respect to the holding portion 401*c* of the holding member 401. More particularly, the holding portion 401*c* includes a shaft supporting portion 401*d* rotatably supporting a shaft portion 403*b* of the lock lever 403, and the lock lever 403 is configured to be pivotable around the shaft portion 403*b*, supported by the shaft supporting portion 401*d*, as a center.

The lock spring 404 is a coil spring held by the shaft portion 403*b*, and a first end and a second end are respectively locked to the holding portion 401*c* of the holding member 401 and the lock lever 403. The lock lever 403 is urged by the lock spring 404 in an arrow LC1 direction, and, by the plunger 402*a* that is drawn by the solenoid 402*b*, pivots in an arrow LC2 direction opposite to the arrow LC1 direction.

Further, an abutment portion 401*e* against which the lock lever 403 abuts is formed in the holding portion 401*c* of the holding member 401. In a state in which the solenoid 402*b* is in a non-energized state, the lock lever 403 abuts against the abutment portion 401*e* by the urging force of the lock spring 404. Thereby, the lock lever 403 is held in a lock position illustrated in FIG. 17. By drawing the plunger 402*a* by the solenoid 402*b* which is in an energized state, the lock lever 403 pivots in the arrow LC2 direction, and moves to an unlock position E2 illustrated in FIG. 11B.

Figure 17A:
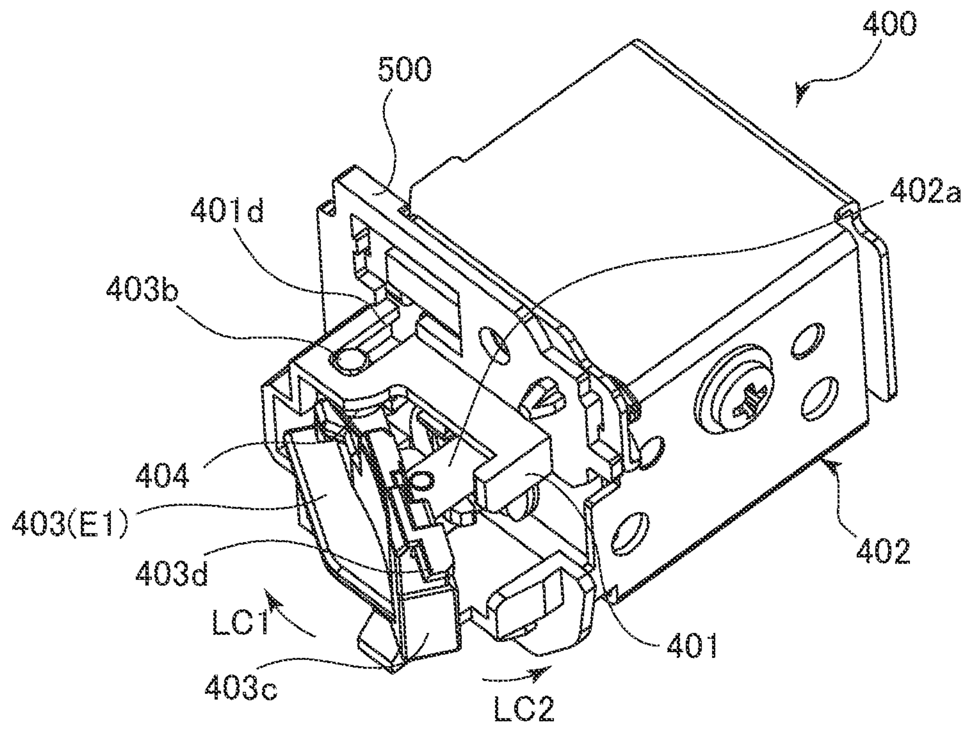
FIG. 17A is a perspective view illustrating the second lock mechanism that is in a lock state.
Figure 17B:
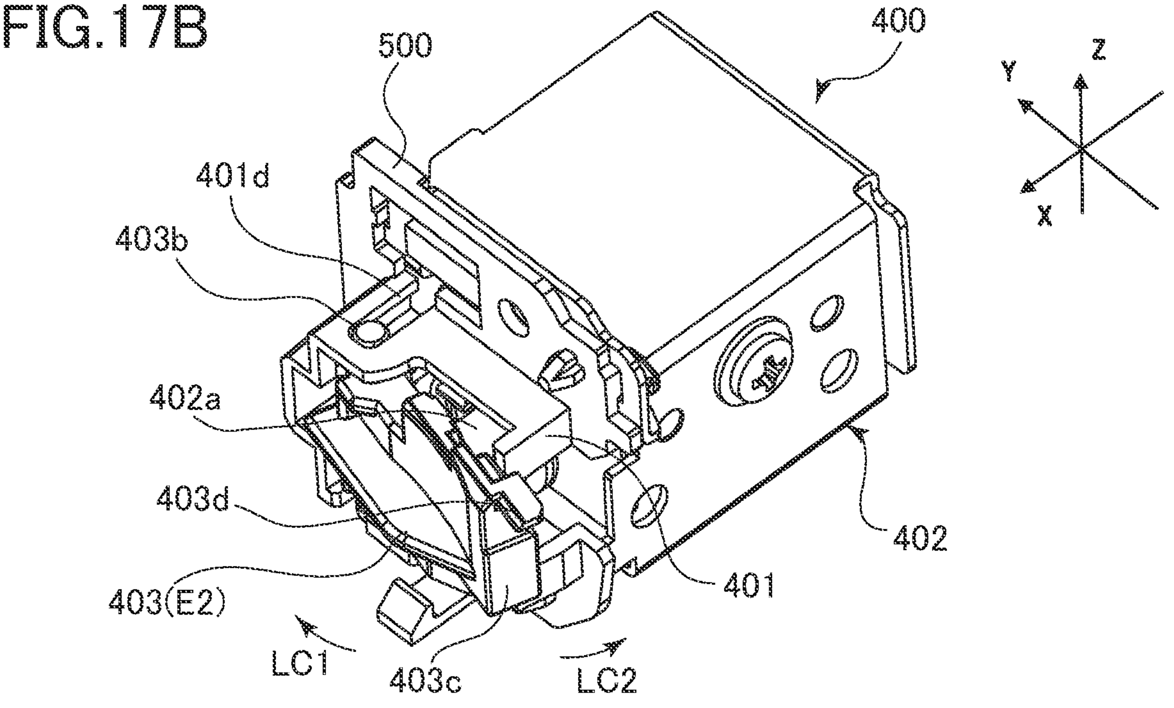
FIG. 17B is a perspective view illustrating the second lock mechanism that is in an unlock state.
Figure 18A:
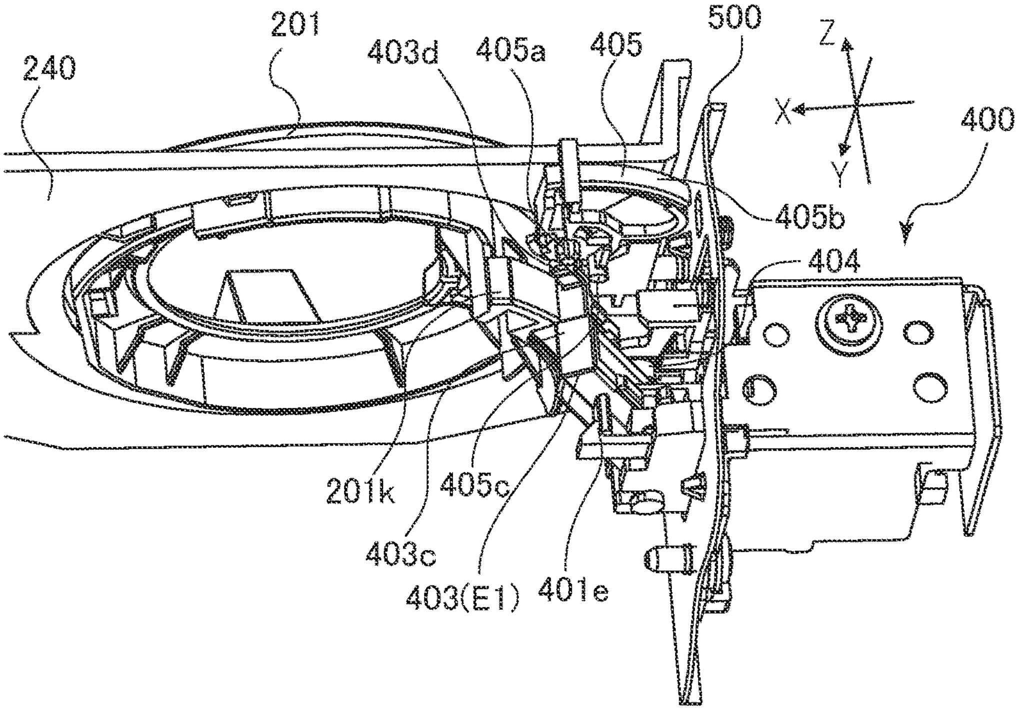
FIG. 18A is a perspective view from a bottom surface side, illustrating the second lock mechanism that is in the lock state.
Figure 18B:
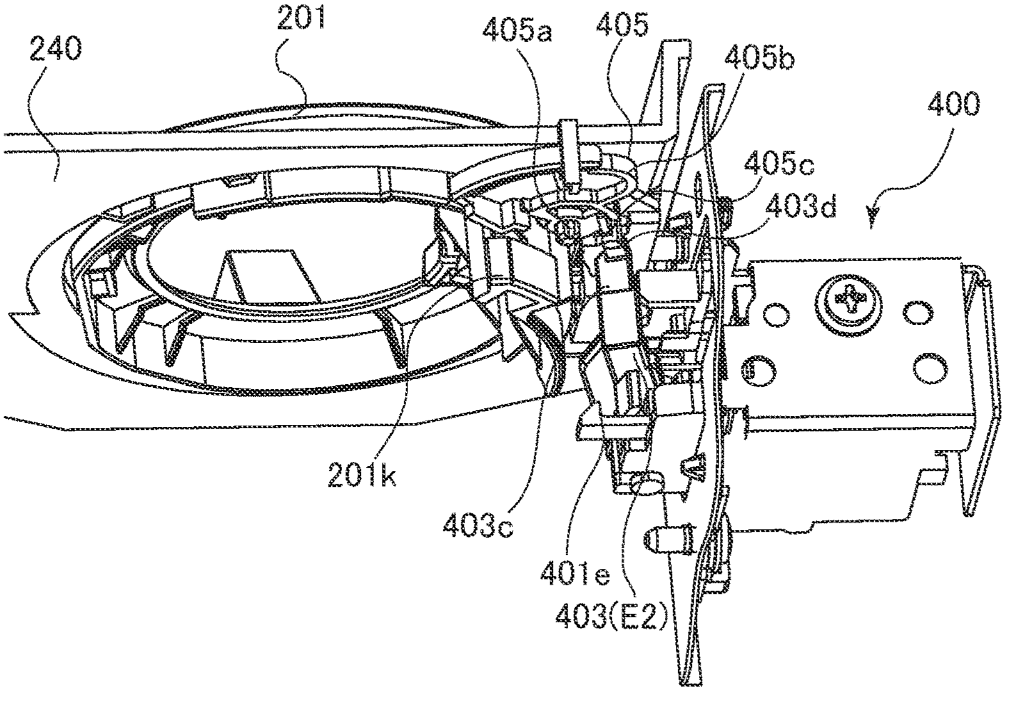
FIG. 18B is a perspective view from a bottom surface side, illustrating the second lock mechanism that is in the unlocked state.

FIGS. 17A and 18A are perspective views illustrating the second lock mechanism 400 in a state in which the lock lever 403 is positioned in the lock position. FIGS. 17B and 18B are perspective views illustrating the second lock mechanism 400 in a state in which the lock lever 403 is positioned in the unlock position E2. As illustrated in FIGS. 17A to 18B, the lock lever 403 includes a first engagement portion 403*c* and a second engagement portion 403*d* formed so as to project farther upward than the first engagement portion 403*c* and outward from the shaft portion 403*b* in a radial direction.

At a time when the lock lever 403 is positioned in the lock position E1, serving as a regulation position and a first regulation position, the first engagement portion 403*c*, serving as an engagement portion, is positioned in a position that projects to a movement locus 420 (refer to FIG. 24B) of the engaged portion 201*k*. Further, at a time when the lock lever 403 is positioned in the unlock position E2, serving as a regulation release position and a first regulation release position, the engagement portion 403*c* is positioned in a position that is receded from the movement locus 420 (refer to FIG. 23B) of the engaged portion 201*k*. That is, at the time when the lock lever 403 is positioned in the lock position E1, the first engagement portion 403*c* becomes possible to engage with the engaged portion 201*k* of the operation portion 201. By the engagement of the engaged portion 201*k* with the first engagement portion 403*c*, the operation portion 201 is regulated in the rotation. Then, since, at the time when the lock lever 403 is positioned in the unlock position E2, the engaged portion 201*k* does not engage with the first engagement portion 403*c*, the operation portion 201 is not regulated in the rotation by the first engagement portion 403*c*.

Figure 19A:
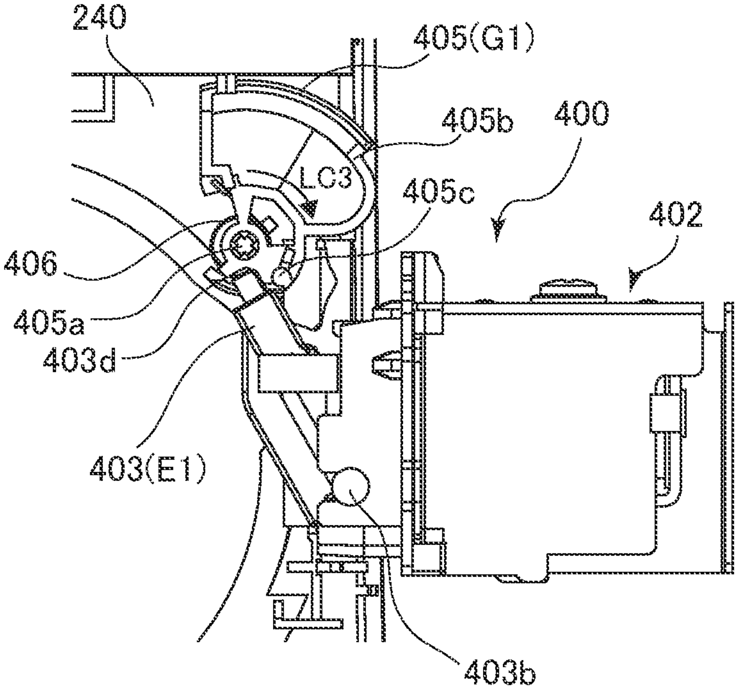
FIG. 19A is a bottom view illustrating the second lock mechanism that is in the lock state.
Figure 19B:
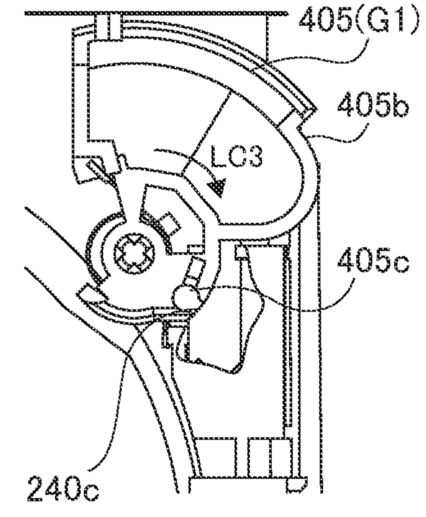
FIG. 19B is an expanded view of FIG. 19A.
Figure 19C:
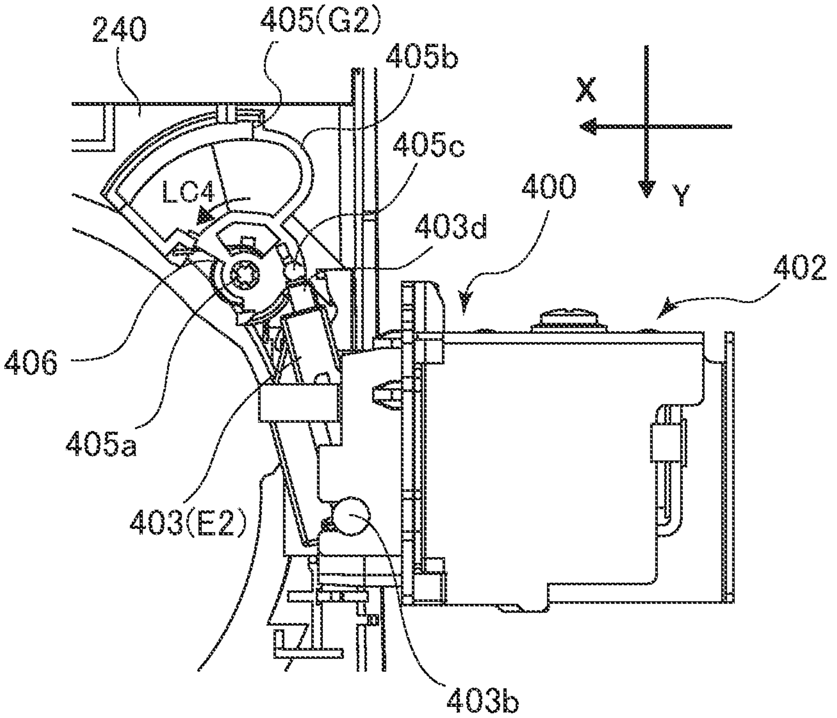
FIG. 19C is a bottom view illustrating the second lock mechanism that is in the unlock state.
Figure 20A:
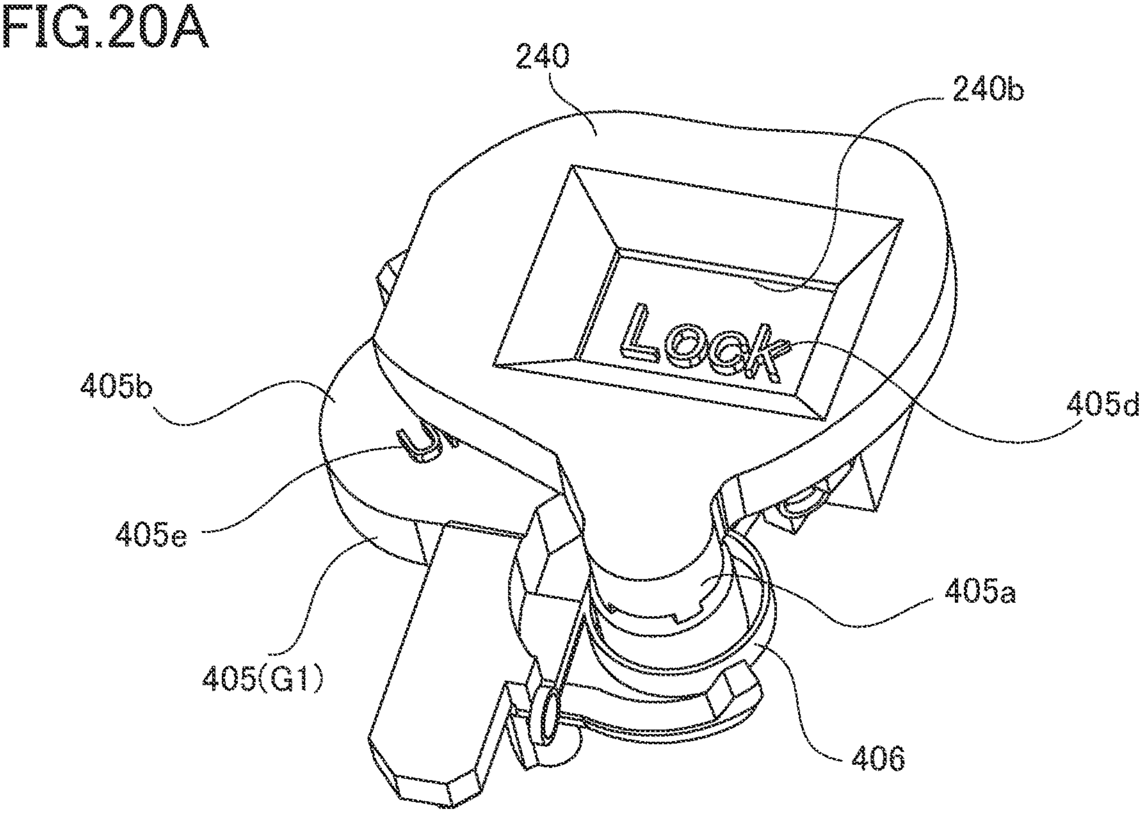
FIG. 20A is a perspective view illustrating a window portion and a first display portion.
Figure 20B:
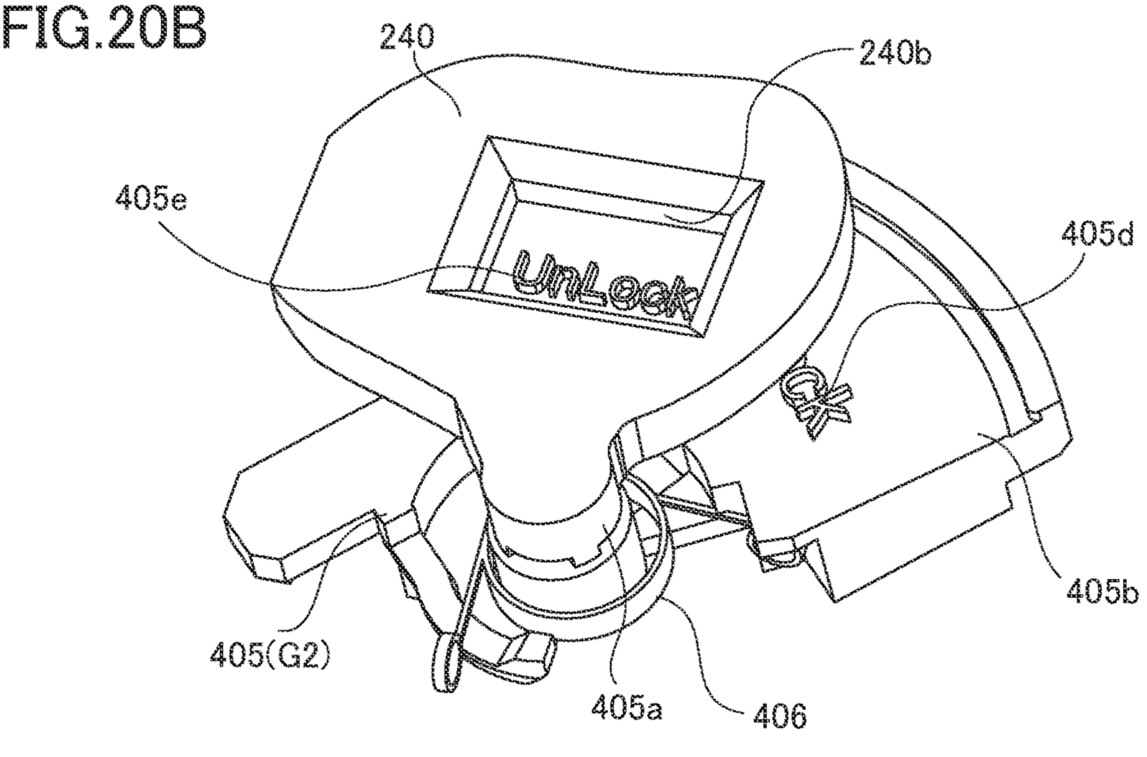
FIG. 20B is a perspective view illustrating the window portion and a second display portion.

FIG. 19A is a bottom view illustrating the display member 405 at the time when the lock lever 403 is positioned in the lock position E1. FIG. 19B is an enlarged view of FIG. 19A. FIG. 19C is a bottom view illustrating the display member 405 at the time when the lock lever 403 is positioned in the unlock position E2. FIG. 20A is a perspective view from an upper surface side, illustrating the display member 405 and the top surface portion 240 at the time when the lock lever 403 is positioned in the lock position E1. FIG. 20B is a perspective view from the upper surface side, illustrating the display member 405 and the top surface portion 240 at the time when the lock lever 403 is positioned in the lock position E1.

As illustrated in FIGS. 18A to 19B, the display member 405 is rotatably supported with respect to the top surface portion 240 around a pivot shaft 405*a* as a center. The display member 405 includes a display portion 405*b* formed in a substantially fan-shaped plate shape and a boss portion 405*c* projecting downward from the display portion 405*b*. The display member 405 is urged in an arrow LC3 direction by a coil spring 406 held by the pivot shaft 405*a*. A first end and a second end of the coil spring 406 are respectively locked to the top surface portion 240 and the display member 405.

At the time when the lock lever 403 is positioned in the lock position E1, the boss portion 405*c* of the display member 405 that is urged in the arrow LC3 direction by the coil spring 406 abuts against an abutment surface 240*c* disposed on a bottom surface side of the top surface portion 240. Thereby, the display member 405 is positioned in a lock display position G1, serving as a first position. As illustrated in FIGS. 20A and 20B, a hole-shaped window portion 240*b* is formed in the top surface portion 240, serving as a cover, and a first display 405*d* and a second display 405*e* are disposed on an upper surface of the display portion 405*b* of the display member 405.

The first display 405*d* and the second display 405*e* are arranged in positions different from each other in a pivot direction (LC3 and LC4 directions) of the display member 405. In the present embodiment, the first display 405*d* has an inscription "Lock" signifying that, as the lock lever 403 is positioned in the lock position E1, the movement regulation of the operation portion 201 is applied. The second display 405*e* has an inscription "Unlock" signifying that, as the lock lever 403 is positioned in the unlock position E2, the movement regulation of the operation portion 201 is not applied.

As illustrated in FIG. 20A, at the time when the display member 405 is positioned in the lock display position G1, it is possible to visually confirm the first display 405*d* from an upper surface side of the image forming apparatus 1 via the widow portion 240*b*. To be noted, while, in the present embodiment, by an abutment of the boss portion 405*c* of the display member 405 against the abutment surface 240*c* of the top surface portion 240, the display member 405 is positioned in the lock display position G1, it is not limited to this. For example, it is acceptable to position the display member 405 in the lock display position G1 by an abutment of a part of the display member 405, other than the boss portion 405*c*, against the top surface portion 240. Further, it is acceptable to position the display member 405 in the lock display position G1 by an abutment of any part of the display member 405 with respect to the side plate 500.

As illustrated in FIGS. 18*b*, 19B, and 20B, when the solenoid 402*b* has been energized and the lock lever 403 has moved from the lock position E1 to the unlock position E2, the boss portion 405*c* is pressed by the second engagement portion 403*d* of the lock lever 403. Thereby, while resisting against the urging force of the coil spring 406, the display member 405 pivots in the arrow LC4 direction opposite to the arrow LC3 direction. Then, by holding the boss portion 405*c* by the second engagement portion 403*d* of the lock lever 403 positioned in the unlock position E2, the display member 405 is held in an unlock display position G2, serving as a second position illustrated in FIGS. 18B, 19B, and 20B. At this time, since the boss portion 405*c* comes into pressure contact with the second engagement portion 403*d* by the urging force of the coil spring 406, the display member 405 is not displaced from the unlock display position G2.

As illustrated in FIG. 20B, at a time when the display member 405 is positioned in the unlock display position G2, it is possible to visually confirm the second display 405*e* from the upper surface side of the image forming apparatus 1 via the window portion 240*b*. When the solenoid 402*b* has been brought into the non-energized state from the energized state, by the urging force of the lock spring 404, the lock lever 403 moves from the unlock position E2 to the lock position E1. Thereby, the engagement of the second engagement portion 403*d* of the lock lever 403 with the boss portion 405*c* of the display member 405 is disengaged, and, by the urging force of the coil spring 406, the display member 405 moves from the unlock display position G2 to the lock display position G1.

That is, the display member 405 is configured to move in conjunction with the operation of the solenoid 402*b* such that, when the lock lever 403 is in the lock position E1, the display member 405 is in the lock display position G1 and, when the lock lever 403 is in the unlock position E2, the display member 405 is in the unlock display position G2.

Control Block

Figure 21:
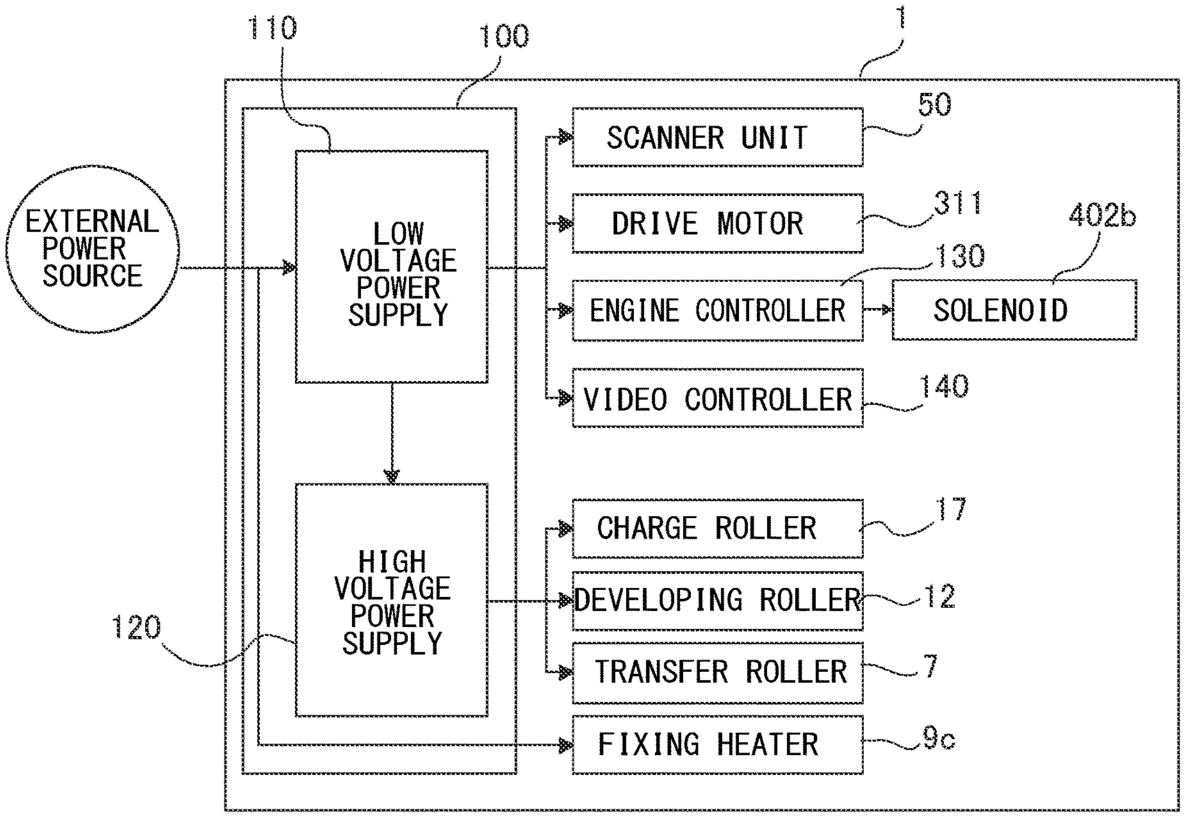
FIG. 21 is a block diagram for illustrating a function of a power supply board.

FIG. 21 is a block diagram illustrating a function of the circuit board 100 of the present embodiment. The circuit board 100 includes a low voltage power supply portion 110 and a high voltage power supply portion 120. The low voltage power supply portion 110 acquires power from an external power source via a power input portion, not shown, attached onto an end portion of the board, and converts an alternating voltage into a stable direct current voltage via a rectifying/smoothing circuit including an electrolytic capacitor. Thereafter, after having converted the direct current voltage into a high frequency alternating voltage by a switching element such as a transistor, the low voltage power supply portion 110 inputs the high frequency alternating voltage to a low voltage power transformer. The low voltage power transformer converts the high frequency alternating voltage that is an input voltage into an alternating voltage (output voltage) that has a desired voltage value. The low voltage power supply portion 110 again converts the alternating voltage into the direct current voltage, and outputs the obtained direct current voltage to the high voltage power supply portion 120. Further, since losses in each circuit component appear as heat, a heat sink, not shown, manufactured of aluminum and iron is disposed in the low voltage power supply portion 110 for dissipating the heat.

The high voltage power supply portion 120 converts voltage (for example, 24 volts (V)) supplied from the low voltage power supply portion 110 into a high voltage required for image forming processes such as charging, developing, and transferring. The voltage supplied from the low voltage power supply portion 110 is converted into a charging voltage by a charging transformer, and supplied to the charge roller 17. The voltage supplied from the low voltage power supply portion 110 is converted into a developing voltage by a developing transformer 123, and supplied to the developing roller 12. The voltage supplied from the low voltage power supply portion 110 is converted into a transferring voltage by a transferring transformer 124, and supplied to the transfer roller 7.

The low voltage power supply portion 110 supplies the voltage (for example, 3.3 V or 5V) not only to the high voltage power supply portion 120 but also to the scanner unit 50, the drive motor 311, the engine controller 130, and a video controller 140. Here, the engine controller 130, serving as a control unit, has a role of coordinating and controlling various process members, and controls the solenoid 402*b*. The engine controller 130 includes a central processing unit (CPU), not shown, a random access memory (RAM), not shown, used for calculations and the temporary storage of data required for controlling the image forming apparatus 1, and the ROM, not shown, storing programs and various data for controlling the image forming apparatus 1. The video controller 140 receives print data by communicating with external apparatuses such as a personal computer, and has a role of notifying the engine controller 130 of a result obtained by analyzing the print data. To be noted, it is acceptable to dispose the engine controller 130 and the video controller 140 either on a different board from the circuit board 110 or on the same board.

Further, the alternating-current power that the power supply input portion has received from a commercial power supply is supplied not only to the low voltage power supply portion 110 but also to the fixing heater 9c. To be noted, the drive of such as rollers in the fixing unit 9 is performed by the drive motor 311.

Energization of Solenoid

Next, using a flowchart of FIG. 22, an energization judgement process of the solenoid 402b will be described. In other words, energization conditions of the solenoid 402b are determined along the flowchart of FIG. 22, and, if the energization conditions, serving as predetermined conditions, are met, an energization is performed.

Figure 22:
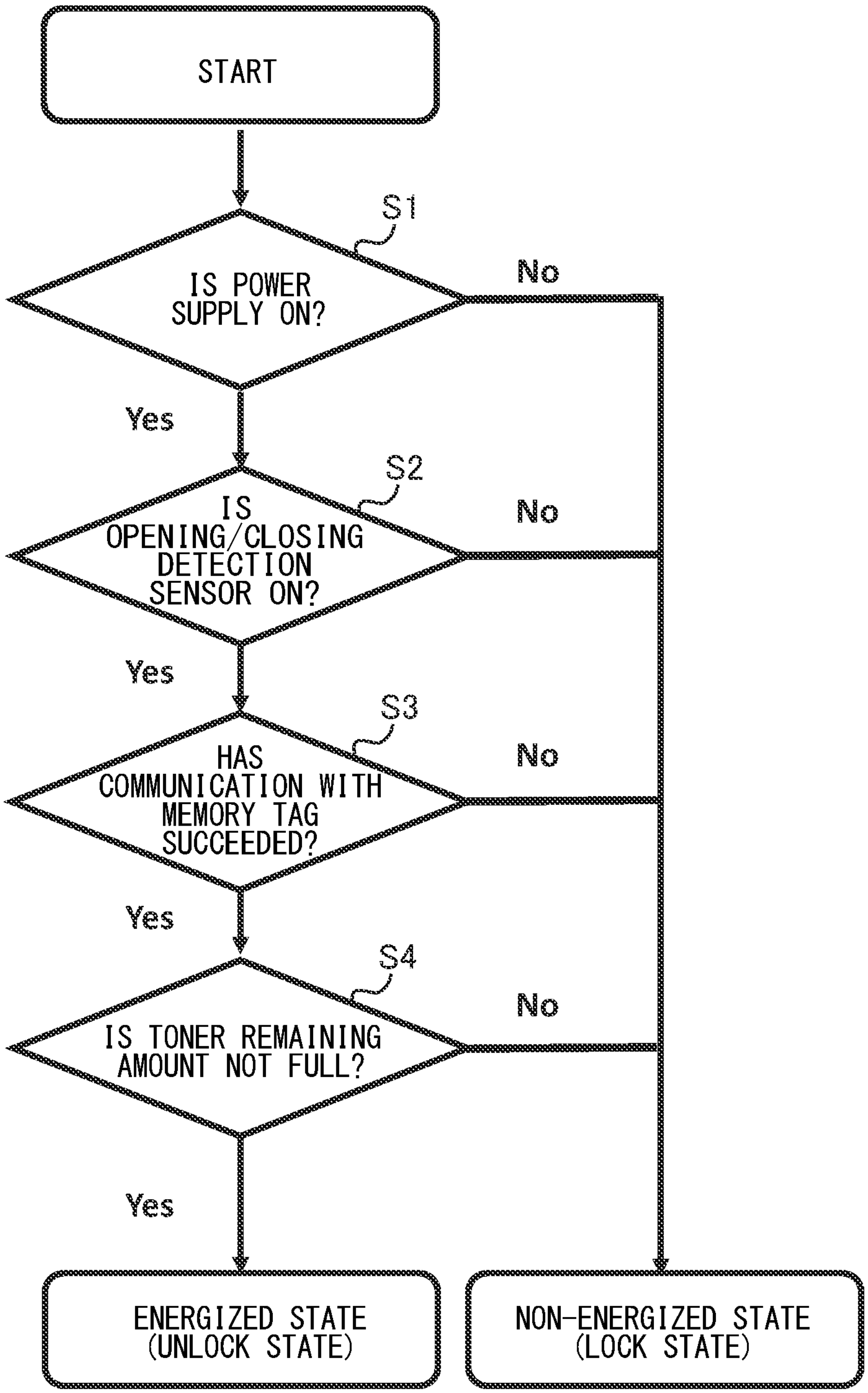
FIG. 22 is a flowchart illustrating the energization judgement processing of a solenoid.

As illustrated in FIG. 22, upon starting the energization judgement process of the solenoid 402b, the engine controller 130 judges whether or not the power supply of the image forming apparatus 1 is on (STEP S1). In a case where it is judged that the power supply of the image forming apparatus 1 is on (STEP S1: Yes), the engine controller 130 judges whether or not the opening/closing detection sensor 80 is on (STEP S2). As described in FIGS. 3A to 3C, when the opening/closing detection sensor 80 is on, it means that the back cover 73 is in the closed position.

In a case where it is judged that the opening/closing detection sensor 80 is on (STEP S2: Yes), the engine controller 130 judges whether or not communication with the memory tag 219 has been succeeded (STEP S3). The communication with the memory tag 219 means that replenishment pack 210 has been attached to the replenishment portion 200, and that the authentication information of the memory tag 219 disposed in the replenishment pack 210 has been read by the apparatus body contact 170.

In a case where the communication with the memory tag 219 has been succeeded (STEP S3: Yes), the engine controller 130 judges whether or not the remaining amount of the toner in the interior of the storage portion 18 detected by the remaining amount detection sensor 312 is not full, that is, not a filled full state (STEP S4). In a case where the remaining amount of the toner in the interior of the storage portion 18 is less than a predetermined amount, it is judged that the remaining amount of the toner is considered to be not full. More particularly, in a case where signal strength (voltage) transmitted by the remaining amount detection sensor 312 is within a predetermined range, it is considered that the remaining amount of the toner is not full. In a case where it is judged that the remaining amount of the toner is not full (STEP S4: Yes), the engine controller 130 energizes the solenoid 402, and brings the second lock mechanism 400 into the unlock state in which the lock lever 403 is positioned in the unlock position E2.

That is, the abovementioned predetermined conditions include that the power supply of the image forming apparatus 1 is on, that the opening/closing detection sensor 80 is on, that the communication with the memory tag 219 has been succeeded, and that the remaining amount of the toner is not full. Then, in a case where the predetermined conditions are met, the engine controller 130 controls the solenoid 402b to release the movement regulation of the operation portion 201.

Figure 23A:
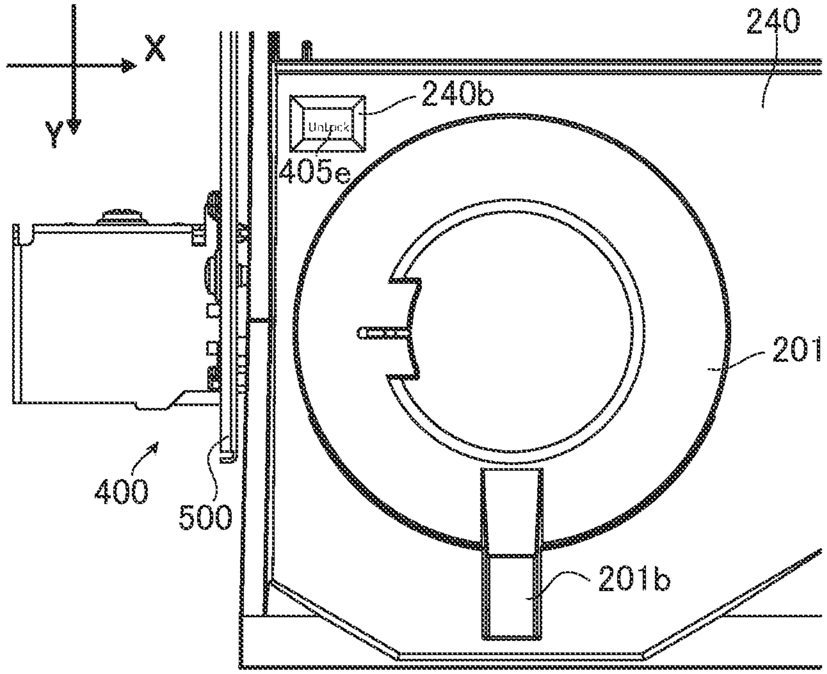
FIG. 23A is a plan view illustrating the second lock mechanism and the operation portion that are in the unlock state.

At this time, as illustrated in FIG. 23A, when the image forming apparatus 1 with the sheet discharge tray 14 opened is viewed from the upper surface side, it is possible to visually confirm the second display 405e of the display member 405 via the window portion 240b. Therefore, the user can easily visually confirm that it is possible to perform the replenishment of the toner to the replenishment portion 200 by the replenishment pack 210, so that it is possible to improve usability. Further, in the case where the image forming apparatus 1 with the sheet discharge tray 14 opened is viewed from the upper surface side, it is not possible to visually confirm the engaged portion 201k of the operation portion 201 and the lock lever 403. Therefore, it is possible to suppress the accidental contact of the lock lever 403 by the user.

Figure 23B:
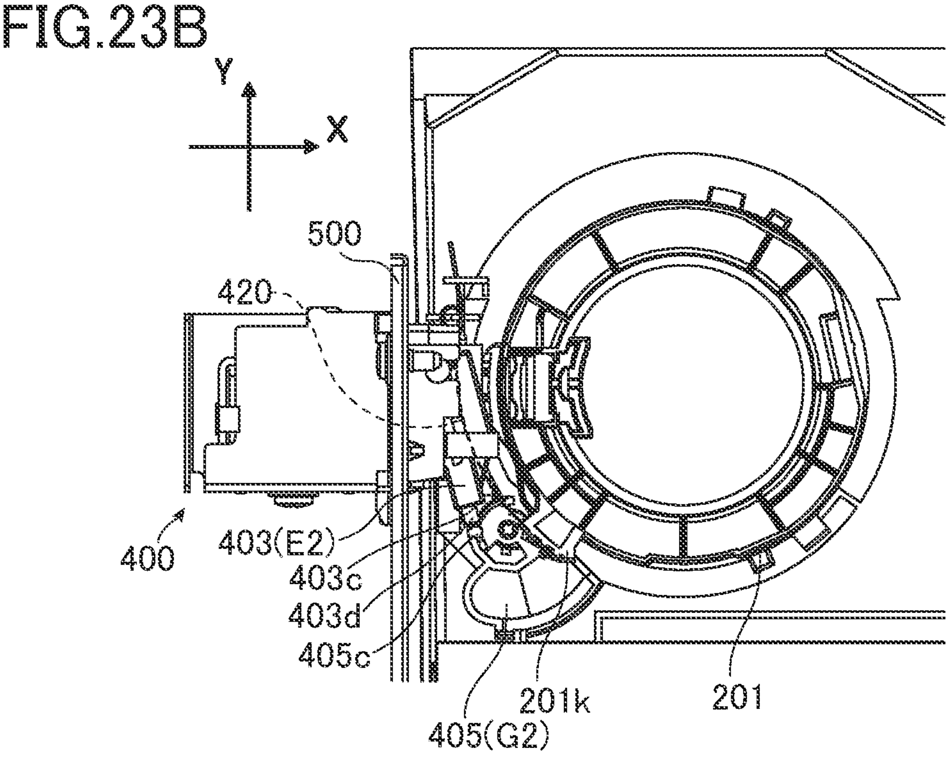
FIG. 23B is a bottom view illustrating the second lock mechanism and the operation portion that are in the unlock state.

Since. as illustrated in FIG. 23B, the first engagement portion 403c of the lock lever 403 positioned in the unlock position E2 is receded from the movement locus 420 of the engaged portion 201k of the operation portion 201, the operation portion 201 is not regulated in the rotation by the lock lever 403. Further, the second engagement portion 403d of the lock lever 403 positioned in the unlock position E2 holds the boss portion 405c of the display member 405 positioned in the unlock display position G2.

On the other hand, in a case where it is judged that the power supply of the image forming apparatus 1 is not on (STEP S1: No), or in a case where it is judged that the opening/closing detection sensor 80 is off (STEP S2: No), the engine controller 130 does not energize the solenoid 402b. This is because, since it is not possible to supply power to the agitation member 60 and the opening/closing detection sensor 80 when the power supply of the image forming apparatus 1 is off, it is not possible to detect the remaining amount of the toner in the interior of the storage portion 18.

Further, also in a case where the communication with the memory tag 219 has not been succeeded (STEP S3: No), or in a case where it is judged that the remaining amount of the toner is full (STEP S4: No), the engine controller 130 does not energize the solenoid 402b. In the case where the communication with the memory tag 219 has not been succeeded, for example, there is a possibility that the replenishment pack 210 is not firmly attached to the replenishment portion 200. In the case where the remaining amount of the toner is full, it is not possible to smoothly discharge the toner in the interior of the replenishment pack 210 to the storage portion 18. In a case of the non-energization state in which the solenoid 402b is not energized, the second lock mechanism 400 becomes the lock state in which the lock lever 403 is positioned in the lock position E1.

At this time, when the image forming apparatus 1 with the sheet discharge tray 14 opened is viewed from the upper surface side, it is possible to visually confirm the first display 405d of the display member 405 via the window portion 240b. Therefore, the user can easily visually confirm that it is not possible to replenish the toner to the replenishment portion 200 by the replenishment pack 210, and it is possible to improve the usability.

Further, as illustrated in FIG. 6D, even in the state in which the replenishment pack 210 is attached to the replenishment portion 200, the user can visually confirm the first display 405d via the window portion 240b. Therefore, even after the replenishment pack 210 has been attached to the replenishment portion 200, the user can recognize that the second lock mechanism is in the lock state, and it is possible to improve the usability. To be noted, also in a case where the second display 405e is displayed via the window portion 240b in the state in which the replenishment pack 210 has been attached to the replenishment portion 200, similarly, it is possible to visually confirm the second display 405e.

Figure 24A:
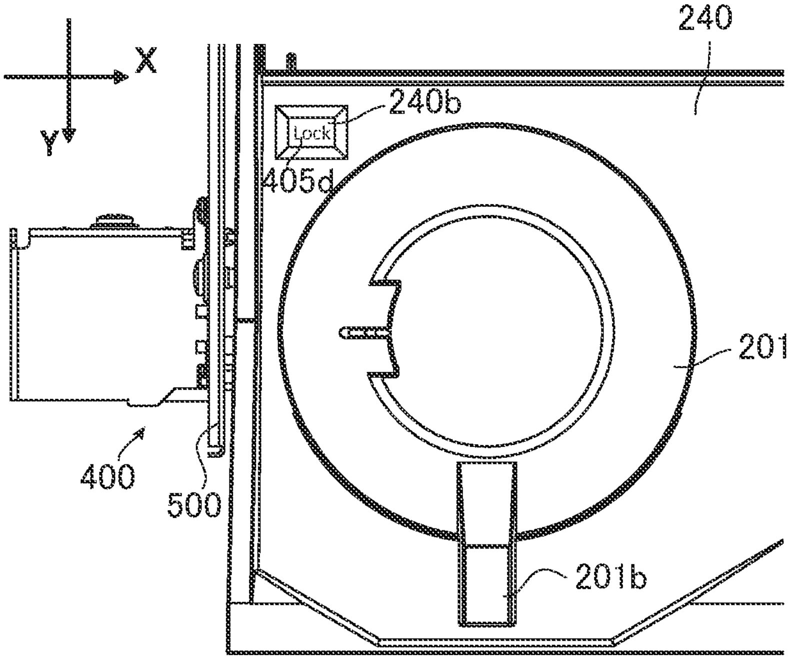
FIG. 24A is a plan view illustrating the second lock mechanism and the operation portion that are in the lock state.
Figure 24B:
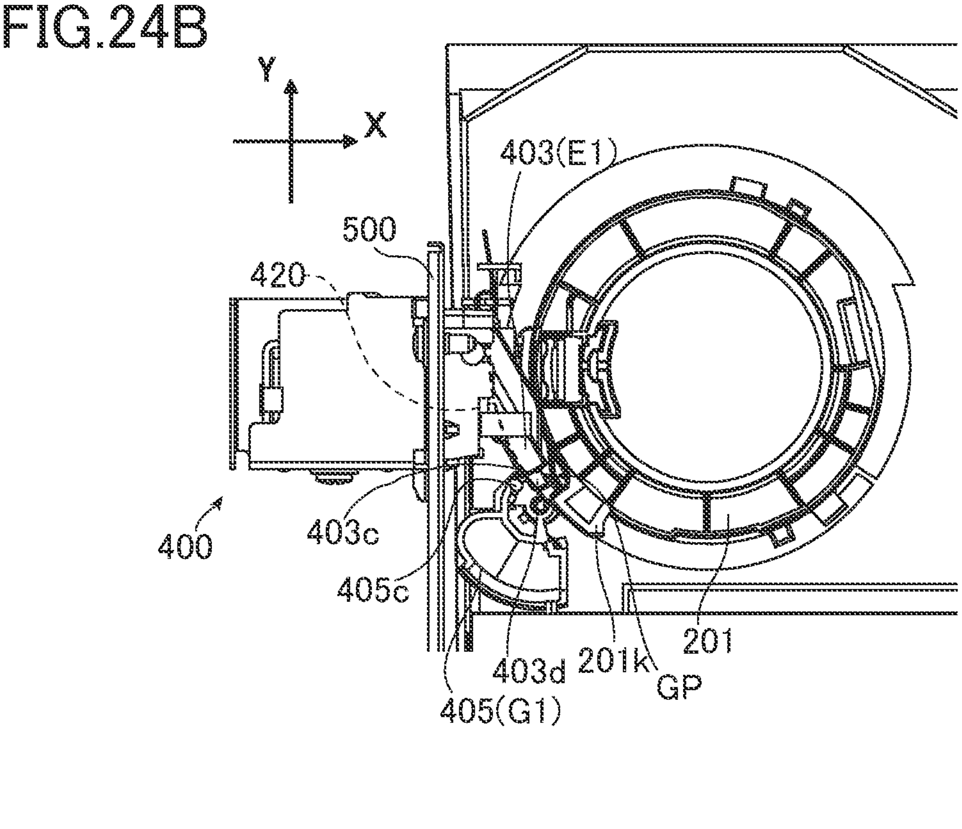
FIG. 24B is a bottom view illustrating the second lock mechanism and the operation portion that are in the unlock state.

As illustrated in FIG. 24B, the first engagement portion 403c of the lock lever 403 positioned in the lock position E1 projects to the movement locus 420 of the engaged portion 201k of the operation portion 201. At this time, the first engagement portion 403c of the lock lever 403 is separated with respect to the engaged portion 201k of the operation portion 201 by leaving a predetermined gap GP in the circumferential direction of the operation portion 201. By disposing the gap GP between the first engagement portion 403*c* and the engaged portion 201*k* as described above, when the solenoid 402*b* is energized, friction force is not generated between the first engagement portion 403*c* and the engaged portion 201*k*, so that it is possible to reduce the output and the size of the solenoid 402*b*.

Here, in the state in which the replenishment pack 210 is not attached to the replenishment portion 200, the operation portion 201 is positioned in the operating position by the first lock mechanism 250. More particularly, by inserting the lever lock press portion 227*a* of the lever lock member 227 into the opening portion 201*e* of the operation portion 201, the operation portion 201 is positioned in the operating position. Therefore, in the state in which the replenishment pack 210 is not attached to the replenishment portion 200, the operation portion 201 is always positioned in the operating position, and the gap GP is secured between the first engagement portion 403*c* and the engaged portion 201*k*.

In other words, when the lock lever 403 is in the lock position E1 and the lever lock member 227 is in the regulation position F1, the lever lock member 227 regulates the movement of the operation portion 201 such that the operation portion 201 does not come into contact with the first engagement portion 403*c* of the lock lever 403. Therefore, by energizing the solenoid 402*b*, the lock lever 403 of the second lock mechanism 400 can be easily moved from the lock position E1 to the unlock position E2.

Figure 25A:
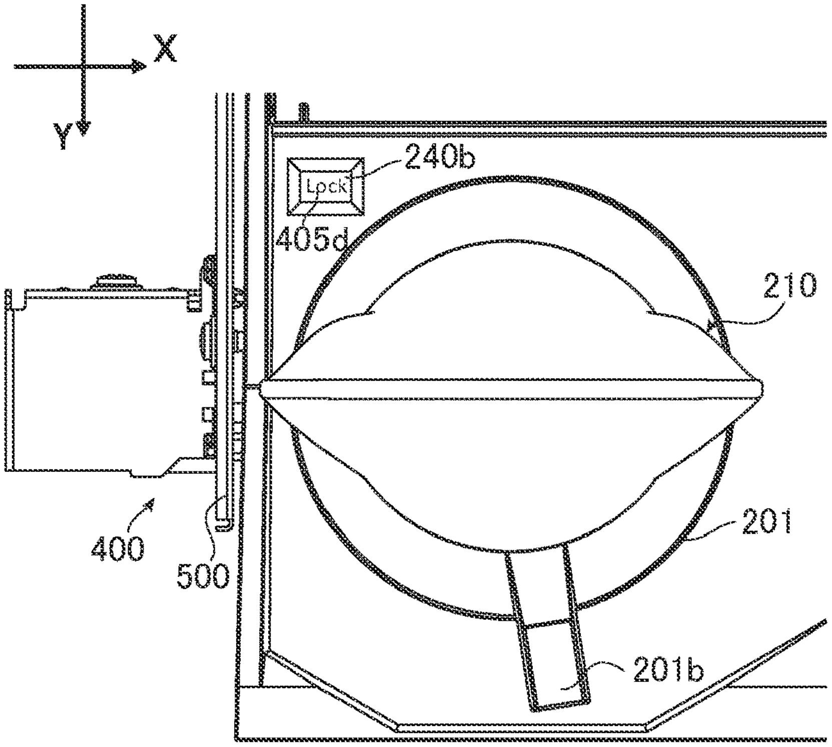
FIG. 25A is a plan view illustrating a state in which the operation portion is operated at a time when the second lock mechanism is in the lock state.
Figure 25B:
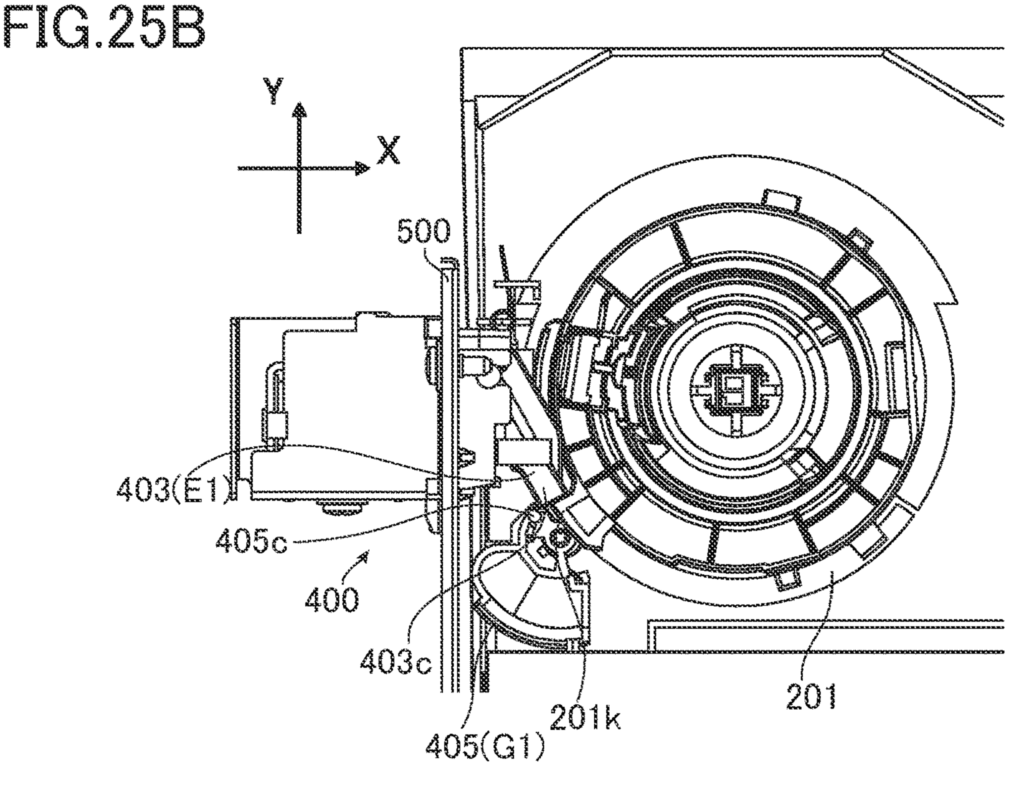
FIG. 25B is a bottom view illustrating the state in which the operation portion is operated at the time when the second lock mechanism is in the lock state.

When the lever portion 201*b* of the operation portion 201 is pivoted toward the replenishing position at the time when the second lock mechanism 400 is in the lock state, as illustrated in FIG. 25B, the engaged portion 201*k* of the operation portion 201 moves only by the extent of the gap GP, and abuts against the second engagement portion 403*d*. Thereby, the operation portion 201 is regulated in the rotation. To be noted, since, at this time, the lock lever 403 does not move from the lock position E1, also the display member 405 that moves concurrently with the lock lever 403 is retained in the lock display position G1. Therefore, as illustrated in FIG. 25A, also the first display 405 that is visually confirmed via the widow portion 240*b* does not move.

As described above, in the present embodiment, it is possible to regulate the movement of the operation portion 201 by the second lock mechanism 400 that is switched between the lock state and the unlock state by the solenoid 402*b*. Since it is undesirable to perform the toner replenishment when the predetermined conditions described above are not met, by regulating an operation (rotation) of the operation portion 201, it is possible to easily regulate the toner replenishment to the image forming apparatus 1.

Second Embodiment

While, next, a second embodiment of the present invention will be described, in the second embodiment, only the first and second displays 405*d* and 405*e* of the display member 405 of the first embodiment are changed. Therefore, configurations similar to the first embodiment will be described by omitting illustrations or by putting the same reference characters on drawings.

Figure 26:
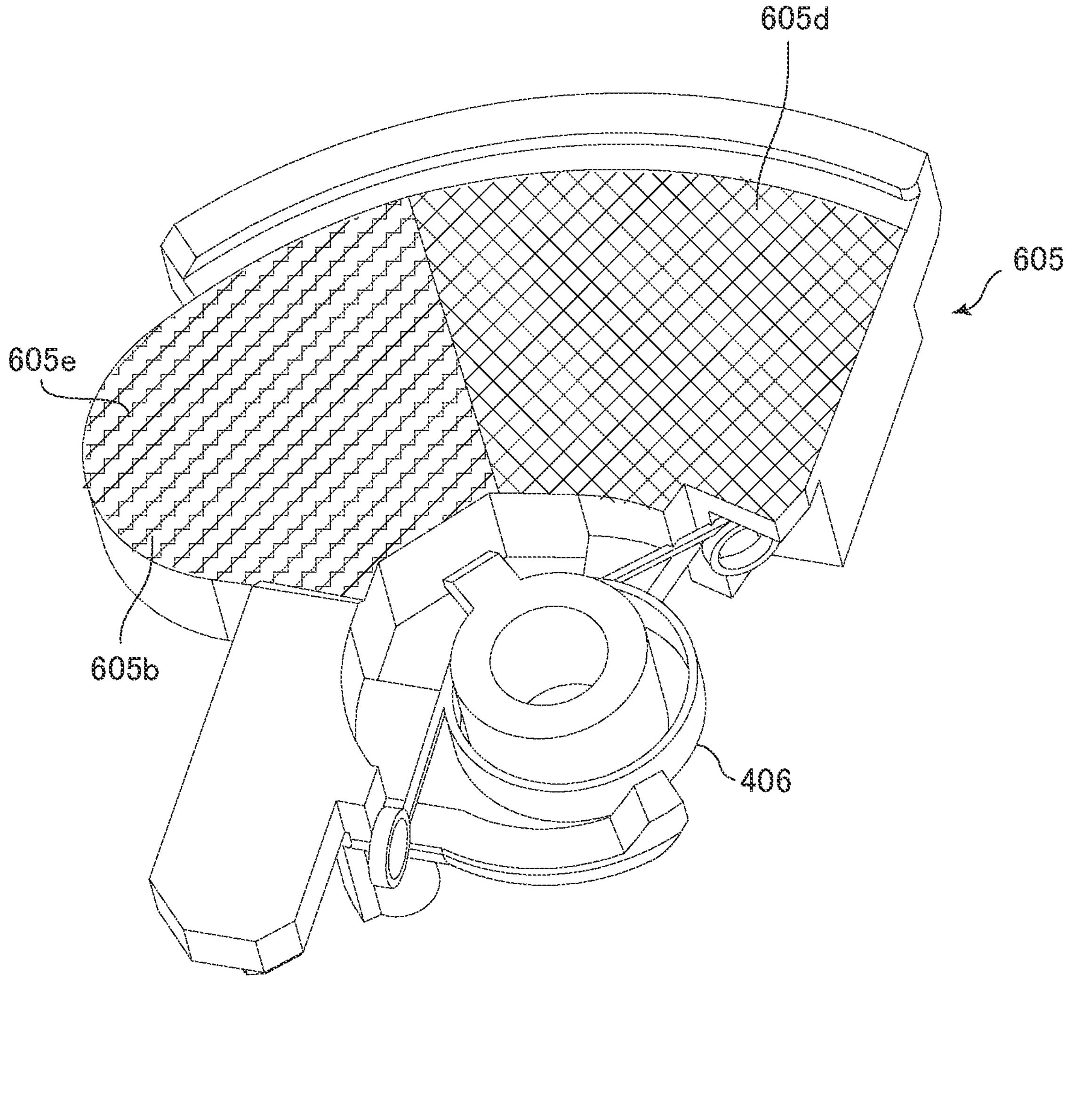
FIG. 26 is a perspective view illustrating a display member of a second embodiment.

A display member 605 of the present embodiment includes a display portion 605*b*, and a first display 605*d* and a second display 605*e* are disposed on an upper surface of the display portion 605*b*. The first display 605*d* and the second display 605*e* are colored in colors different from each other, and, in FIG. 26, are shown in different hatch patterns.

At a time when the display member 605 is positioned in the lock display position G1, it is possible to visually confirm the first display 605*d* from the upper surface side of the image forming apparatus 1 via the window portion 240*b* (refer to FIG. 20A). At a time when the display member 605 is positioned in the unlock display position G2, it is possible to visually confirm the second display 605*e* from the upper surface side of the image forming apparatus 1 via the window portion 240*b* (refer to FIG. 20A). The first display 605*d* is a mark provided with a warm color, for example, such as red. The second display 605*e* is a mark provided with a cold color, for example, such as blue.

As described above, in the present embodiment, whether the second lock mechanism 400 is in the lock state or the unlock state is indicated by the first display 605*d* or the second display 605*e* of the display member 605. The first display 605*d* and the second display 605*e* are respectively colored in the warm color and the cold color, and the warm color such as red generally represents the prohibition of the manipulation, and the cold color such as blue generally represents the permission of the manipulation. Therefore, the user can sensuously recognize the availability of the manipulation of the operation portion 201 and the toner replenishment to the replenishment portion 200. To be noted, the warm color includes, for example, red, orange and yellow, and the cold color includes, for example, blue-green, blue, and blue-violet. The first display 605*d* is preferably colored in red, and the second display 605*e* is preferably colored in blue.

Other Embodiments

To be noted, while, in any of the embodiments described above, the attraction type solenoid 402*b* is used as the actuator to drive the second lock mechanism 400, it is not limited to this. For example, in place of the solenoid 402*b*, it is acceptable to apply a push solenoid and a self-holding solenoid. Further, in place of the solenoid 402*b*, it is acceptable to apply such as a motor and a linear actuator. Further, the interlock mechanism of the solenoid unit 402, the lock lever 403, and the display member 405 or 605 are not limited to the embodiments described above. For example, it is acceptable to move the display member 405 or 605 by being pressed, not with the second engagement portion 403*d* of the lock lever 403, but with the plunger 402*a*.

Further, while, in any of the embodiments described above, each of the first displays 405*d* and 605*d* and the second displays 405*e* and 605*e* is constituted from a mark provided with a letter or a color, it is not limited to this. For example, it is acceptable that the first display includes a pictorial symbol of a secured key and the second display includes a pictorial symbol of an unsecured key. In addition, it is acceptable to display the lock state and the unlock state by the second lock mechanism 400 by differentiating the first and second displays using letters, colors, pictorial symbols, uneven patterns, and materials.

Further, in any of the embodiments described above, the solenoid 402*b* is energized in the case where that the power supply of the image forming apparatus 1 is on, that the opening/closing detection sensor 80 is on, that the communication with the memory tag 219 has been succeeded, and that the remaining amount of the toner is not full are met. However, the energization conditions of the solenoid 402*b* are not limited to this. For example, in a case where one to three conditions among the conditions shown in STEPS S1 to S4 of FIG. 22 are met, it is acceptable to energize the solenoid 402*b*.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus to which a toner container is detachably attached, the toner container including an opening portion for supplying toner and a container shutter configured to open and close the opening portion, the image forming apparatus comprising:

(i) an attaching portion to which the toner container is attached, the attaching portion including;

(i-1) a receiving port configured to receive the toner supplied from the toner container; and (i-2) an operation member configured to be operated by a user to move the container shutter to open and close the opening portion in a state in which the toner container is attached to the attaching portion;

(ii) a toner storage portion configured to store the toner received from the receiving port;

(iii) an actuator configured to move for a regulation of a movement of the operation member; and (iv) a control unit configured to control the actuator, wherein the control unit controls the actuator to move for releasing the regulation of the movement of the operation member in a case where a predetermined condition is met.

2. The image forming apparatus according to claim 1, further comprising a regulation member including an engagement portion configured to engage with the operation member, the regulation member being configured to move between a regulation position and a regulation release position, the regulation position being a position in which the engagement portion projects into a movement locus of the operation member so as to engage with the operation member, the regulation release position being a position in which the engagement portion is receded from the movement locus of the operation member so as not to engage with the operation member, wherein the actuator is configured to move the regulation member between the regulation position and the regulation release position, and wherein the control unit controls the actuator such that the regulation member moves is moved from the regulation position to the regulation release position in a case where the predetermined condition is met.

3. The image forming apparatus according to claim 2, wherein the regulation member, the regulation position, and the regulation release position are respectively a first regulation member, a first regulation position, and a first regulation release position, wherein the image forming apparatus further includes a second regulation member configured to be moved between a second regulation position and a second regulation release position, the second regulation position being a position in which the second regulation member regulates the movement of the operation member, the second regulation release position being a position in which the second regulation member releases a regulation of the movement of the operation member, wherein the second regulation member is in the second regulation position in a case where the toner container is not attached to the attaching portion, and is in the second regulation release position in a case where the toner container is attached to the attaching portion, and wherein the second regulation member regulates the movement of the operation member such that the operation member does not come into contact with the engagement portion of the first regulation member in a case where the first regulation member is in the first regulation position and the second regulation member is in the second regulation position.

4. The image forming apparatus according to claim 2, further comprising:

a display member provided with a first display and a second display which are disposed in positions different from each other; and a cover provided with a window portion through which either one of the first display and the second display is visible, wherein the display member is configured to move with respect to the cover between a first position in which the first display is viewed through the window portion, and a second position in which the second display is viewed through the window portion, and wherein the display member is configured to move in conjunction with a movement of the actuator such that the display member is in the first position in a case where the regulation member is in the regulation position, and such that the display member is in the second position in a case where the regulation member is in the regulation release position.

5. The image forming apparatus according to claim 1, further comprising:

a display member provided with a first display and a second display which are disposed in positions different from each other; and a cover provided with a window portion through which either one of the first display and the second display is visible, wherein the display member is configured to move with respect to the cover between a first position in which the first display is viewed through the window portion, and a second position in which the second display is viewed through the window portion, and wherein the display member is configured to move in conjunction with a movement of the actuator such that the display member is in the first position in a case where the movement of the operation member is regulated, and such that the display member is in the second position in a case where the regulation of the movement of the operation member is released.

6. The image forming apparatus according to claim 5, wherein the first display includes a letter indicating that the movement of the operation member is regulated, and wherein the second display includes a letter indicating that the regulation of the movement of the operation member is released.

7. The image forming apparatus according to claim 5, wherein the first display includes a mark colored in a warm color, and wherein the second display includes a mark colored in a cold color.

8. The image forming apparatus according to claim 1, wherein the predetermined condition includes that a remaining amount of the toner stored in the toner storage portion is less than a predetermined amount.

9. The image forming apparatus according to claim 1, further comprising a sensor configured to emit a signal having strength corresponding to a remaining amount of the toner stored in the toner storage portion, wherein the predetermined condition includes that the strength of the signal is within a predetermined range.

10. The image forming apparatus according to claim 1, wherein the toner container includes a memory that stores information, wherein the attaching portion includes an electrical contact that comes into electrical contact with the memory so as to communicate with the memory when the toner container is attached, and wherein the predetermined condition includes that it is possible to read predetermined information from the memory.

11. The image forming apparatus according to claim 1, further comprising:

an image forming unit configured to form an image on a recording material;

a conveyance unit configured to convey the recording material toward the image forming unit;

a conveyance path through which the recording material conveyed by the conveyance unit passes;

an opening/closing member configured to be movable between a closed position in which the opening/closing member covers the conveyance path and an opening position in which the opening/closing member exposes the conveyance path to an outside of the image forming apparatus; and an opening/closing detection sensor configured to detect an opening/closing of the opening/closing member, wherein the predetermined condition includes that the opening/closing detection sensor has detected that the opening/closing member is in the closed position.

12. The image forming apparatus according to claim 1, wherein the toner container includes:

a bag configured to store the toner; and a nozzle portion configured to communicate with an inside of the bag, the nozzle portion including the opening portion.

13. The image forming apparatus according to claim 1, further comprising a cover on which an opening through which the receiving port is exposed to an outside of the cover is provided, wherein an operation portion of the operating member is provided above the cover.

14. The image forming apparatus according to claim 13, wherein the operation member and the container shutter are configured to rotate, and wherein the operation member is rotatably supported by the cover.

15. The image forming apparatus according to claim 1, further comprising an opening and closing member to move between an open position in which the opening and closing member closes the receiving port, and a closed position in which the opening and closing member closes the receiving port, wherein the opening and closing member is configured to be prevented from being moved from the open position to the closed position by the toner container attached to the attaching portion.

16. An image forming apparatus comprising:

(i) a receiving portion including:

(i-1) a receiving port configured to receive toner supplied from an outside of the image forming apparatus;

(i-2) an apparatus body shutter configured to open and close the receiving port; and (i-3) an operation member configured to be operated by a user to move the apparatus body shutter to open and close the receiving port;

(ii) a toner storage portion configured to store the toner received from the receiving port;

(iii) an actuator configured to move for a regulation of regulate a movement of the operation member; and (iv) a control unit configured to control the actuator, wherein the control unit controls the actuator to move for releasing the regulation of the movement of the operation member in a case where a predetermined condition is met.

17. The image forming apparatus according to claim 16, further comprising a regulation member including an engagement portion configured to engage with the operation member, the regulation member being configured to move between a regulation position and a regulation release position, the regulation position being a position in which the engagement portion projects into a movement locus of the operation member so as to engage with the operation member, the regulation release position being a position in which the engagement portion is receded from the movement locus of the operation member so as not to engage with the operation member, wherein the actuator is configured to move the regulation member between the regulation position and the regulation release position, and wherein the control unit controls the actuator such that the regulation member is moved from the regulation position to the regulation release position in a case where the predetermined condition is met.

18. The image forming apparatus according to claim 16, further comprising:

a display member provided with a first display and a second display which are disposed in positions different from each other; and a cover provided with a window portion through which either one of the first display and the second display is visible, wherein the display member is configured to move with respect to the cover between a first position in which the first display is viewed through the window portion, and a second position in which the second display is viewed through the window portion, and wherein the display member is configured to move in conjunction with a movement of the actuator such that the display member is in the first position in a case where the movement of the operation member is regulated, and such that the display member is in the second position in a case where the regulation of the movement of the operation member is released.

19. The image forming apparatus according to claim 16, further comprising a cover on which an opening through which the receiving portion is exposed to an outside of the cover is provided, wherein an operation portion of the operating member is provided above the cover, and wherein the apparatus body shutter is provided below the cover.

20. The image forming apparatus according to claim 19, wherein the operation member and the apparatus body shutter are configured to rotate, and wherein the operation member is supported by the cover.

* * * * *